(12) United States Patent
Murayama et al.

(10) Patent No.: US 11,767,118 B2
(45) Date of Patent: Sep. 26, 2023

(54) WASTE DISPOSAL DEVICE FOR AIRCRAFT LAVATORY UNIT

(71) Applicant: The Yokohama Rubber Co., LTD., Tokyo (JP)

(72) Inventors: Hiroshi Murayama, Kanagawa (JP); Mitsuaki Takeda, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 17/995,807

(22) PCT Filed: Jan. 7, 2021

(86) PCT No.: PCT/JP2021/000304
§ 371 (c)(1),
(2) Date: Oct. 7, 2022

(87) PCT Pub. No.: WO2021/210222
PCT Pub. Date: Oct. 21, 2021

(65) Prior Publication Data
US 2023/0120725 A1    Apr. 20, 2023

(30) Foreign Application Priority Data
Apr. 14, 2020 (JP) .................................. 2020-072130

(51) Int. Cl.
*B64D 11/02* (2006.01)
*B65F 1/14* (2006.01)

(52) U.S. Cl.
CPC ................ *B64D 11/02* (2013.01); *B65F 1/14* (2013.01); *B65F 1/1421* (2013.01); *B65F 2001/1494* (2013.01)

(58) Field of Classification Search
CPC .......... B64D 11/02; B65F 1/14; B65F 1/1421; B65F 2001/1494; B65F 1/16
See application file for complete search history.

(56) References Cited

FOREIGN PATENT DOCUMENTS

| CN | 107867516 A | * | 4/2018 | |
|---|---|---|---|---|
| EP | 1854743 A1 | * | 11/2007 | ............ B65F 1/1421 |
| JP | 2007-137671 A | | 6/2007 | |
| WO | 2013/125230 A1 | | 8/2013 | |
| WO | 2019/021987 A1 | | 1/2019 | |

* cited by examiner

*Primary Examiner* — Valentina Xavier
(74) *Attorney, Agent, or Firm* — THORPE NORTH & WESTERN

(57) ABSTRACT

A foot pedal, which swings a waste flap from a closed position to an opened position, is disposed near a section on a floor of an aircraft lavatory unit directly below a waste compartment. A foot pedal support mechanism is configured such that the foot pedal at the upper limit position is inclined and supported with a foot pedal rear end located directly below the waste compartment being located above a foot pedal front end away from the waste compartment and that the foot pedal rear end swings in a vertical direction by using the foot pedal front end as a fulcrum.

15 Claims, 18 Drawing Sheets

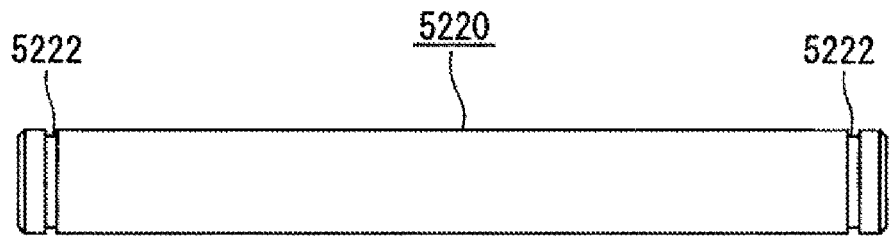
FIG. 14
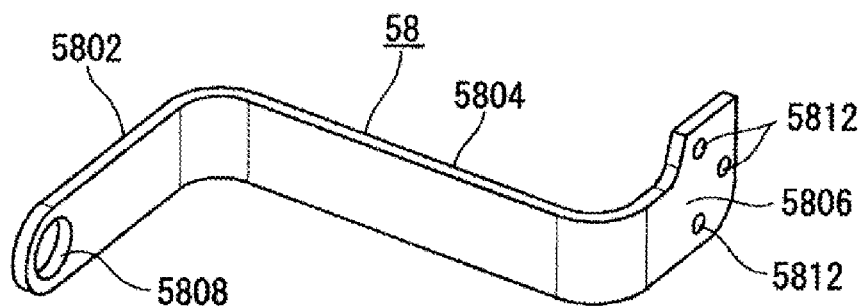
FIG. 15
FIG. 16A
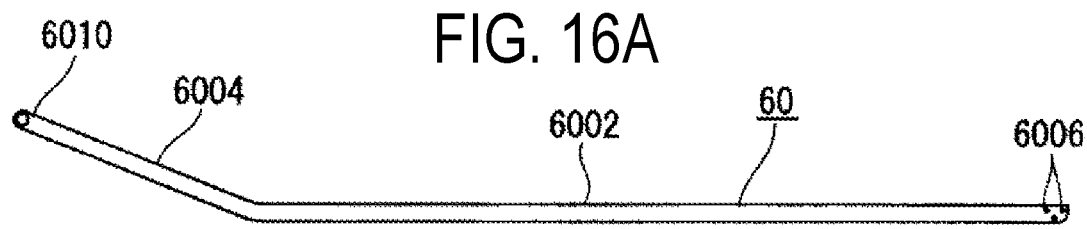
FIG. 16B

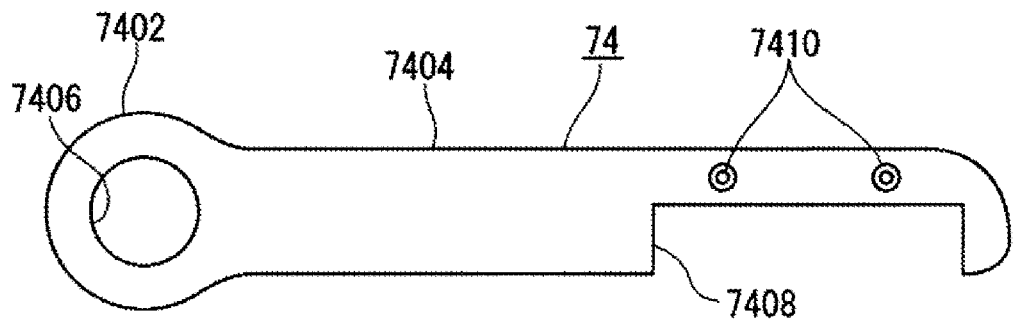
FIG. 21
FIG. 22A
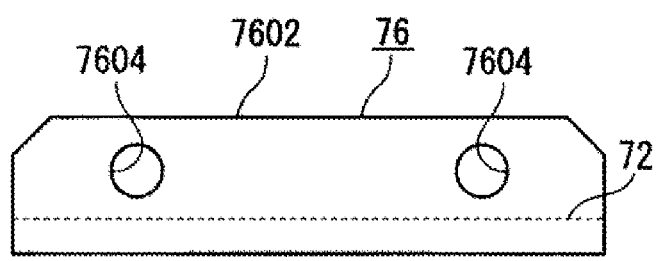
FIG. 22B
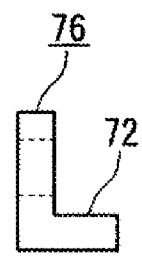

WASTE DISPOSAL DEVICE FOR AIRCRAFT LAVATORY UNIT

TECHNICAL FIELD

The present technology relates to a waste disposal device of the aircraft lavatory unit.

BACKGROUND ART

In an aircraft lavatory unit installed in an aircraft, a receiving chamber that is opened and closed by an opening/closing plate is provided on the floor of a lavatory below a sink and a waste disposal device is received in this receiving chamber.

The waste disposal device includes a waste compartment in which a waste container is placed, and the waste compartment is provided with an opening portion through which the waste container is taken in and out, and this opening portion is opened and closed by the opening/closing plate.

A chute is provided in the upper portion of the waste compartment, a trash feeding port is provided in the upper portion of the opening/closing plate, and a trash feeding opening is formed at a section of the chute corresponding to the trash feeding port.

The chute is provided with a waste flap that is swingably supported between a closed position in which the trash feeding opening is closed and an opened position in which the trash feeding opening is opened, and is always biased in the direction of closing the trash feeding opening.

Then, a waste disposal device is provided in which a fire spreading prevention space is formed between the chute and the waste compartment with the opening portion of the waste compartment closed by the opening/closing plate and the trash feeding opening closed by the waste flap so that the Fire Containment requirements specified in United States Federal Aviation Regulations (FAR) 25.853 are satisfied.

On the other hand, in recent years, as a waste disposal device for general household use, a waste disposal lid that can be opened by stepping on a foot pedal has been provided.

According to such a waste disposal device, the lid can be opened and closed without touching the lid of the waste disposal with a hand, which is preferable from a sanitary point of view.

Accordingly, it is conceivable to add this foot pedal system to the existing waste disposal device of the aircraft lavatory unit, in which the waste flap is pushed open by hand.

However, since the lavatory inside the aircraft lavatory unit is narrow, ensuring only the minimum necessary space from the viewpoint of increasing the number of seats, if the foot pedal is provided on the narrow floor of the lavatory, there is a problem that a person is likely to trip over it in the lavatory.

In addition, since the foot pedal is stepped on by shoes, if the foot pedal is stepped on with the full weight each time trash is thrown away, it is disadvantageous in terms of enhancing the durability of the foot pedal support mechanism and the waste disposal device.

SUMMARY

The present technology provides a foot pedal-type waste disposal device of an aircraft lavatory unit that is advantageous in preventing the user from tripping over in the lavatory and in enhancing durability.

One embodiment of the present technology provides a waste disposal device of an aircraft lavatory unit including a waste compartment provided on a floor of the aircraft lavatory unit and including an opening portion through which a waste container is taken in and out, a chute provided in an upper portion of the waste compartment and including a trash feeding opening formed, and a waste flap swingably supported by the chute between a closed position for closing the trash feeding opening and an opened position for opening the trash feeding opening and biased in a direction of closing the trash feeding opening. A foot pedal-type waste flap opening/closing mechanism that swings the waste flap from the closed position to the opened position by stepping on a foot pedal disposed close to a section on the floor directly below the waste compartment is provided. The foot pedal-type waste flap opening/closing mechanism includes a foot pedal support mechanism that swingably supports the foot pedal between an upper limit position at which the foot pedal can be stepped on and a lower limit position at which the foot pedal is stepped on from the upper limit position and biases the foot pedal allowing the foot pedal to be located at the upper limit position, and the foot pedal support mechanism is configured such that the foot pedal at the upper limit position is inclined and supported with a foot pedal rear end located directly below the waste compartment being located above a foot pedal front end that is away from the waste compartment, and the foot pedal rear end swings in a vertical direction by using the foot pedal front end as a fulcrum.

According to one embodiment of the present technology, the foot pedal is configured such that the foot pedal front end away from the waste compartment at the upper limit position is located at a section lower than the foot pedal rear end directly below the waste compartment and the foot pedal swings by using the section of the foot pedal front end as a fulcrum.

Accordingly, it is advantageous in preventing problems such as shoes getting caught on the foot pedal on the floor of a narrow aircraft lavatory unit and causing a person to trip.

In addition, the foot pedal is configured such that the foot pedal front end away from the waste compartment is the lowest and the foot pedal swings by using the section of the foot pedal front end as a fulcrum. Accordingly, it is easy to guide stepping on the foot pedal with the heel on the floor of the lavatory.

Accordingly, the foot pedal is not likely to be stepped on with a person's whole weight and it is possible to prevent an excessive load from being applied to the foot pedal-type waste flap opening/closing mechanism, which is advantageous in enhancing the durability of the waste disposal device including the foot pedal-type waste flap opening/closing mechanism.

BRIEF DESCRIPTION OF DRAWINGS

FIGS. 11A-11D are explanatory drawings of a lower member that constitutes the foot pedal support mechanism, in which FIG. 11A is a plan view, FIG. 11B is a front view, FIG. 11C is a side view, and FIG. 11D is a perspective view.

FIGS. 12A-12D are explanatory diagrams of an upper member that constitutes the foot pedal support mechanism, in which FIG. 12A is a plan view, FIG. 12B is a front view, FIG. 12C is a side view, and FIG. 12D is a perspective view.

FIGS. 13A-13D are explanatory views of an intermediate member that constitutes a foot pedal support mechanism, in which FIG. 13A is a plan view, FIG. 13B is a front view, FIG. 13C is a side view, and FIG. 13D is a perspective view.

FIG. 14 is a front view of a support shaft that constitutes the foot pedal support mechanism.

FIG. 15 is a perspective view of a lower arm that constitutes the connection mechanism.

FIGS. 16A-16B are explanatory views of a connecting member that constitutes a connection mechanism, in which FIG. 16A is a plan view and FIG. 16B is a front view.

FIG. 21 is a front view of an inner arm that constitutes the waste flap swing mechanism.

FIGS. 22A-22B are explanatory diagrams of an engaging member that constitutes the waste flap swing mechanism, in which FIG. 22A is a front view and FIG. 22B is a side view.

DETAILED DESCRIPTION

Next, embodiments of the present technology will be described with reference to the drawings.

Figure 1:
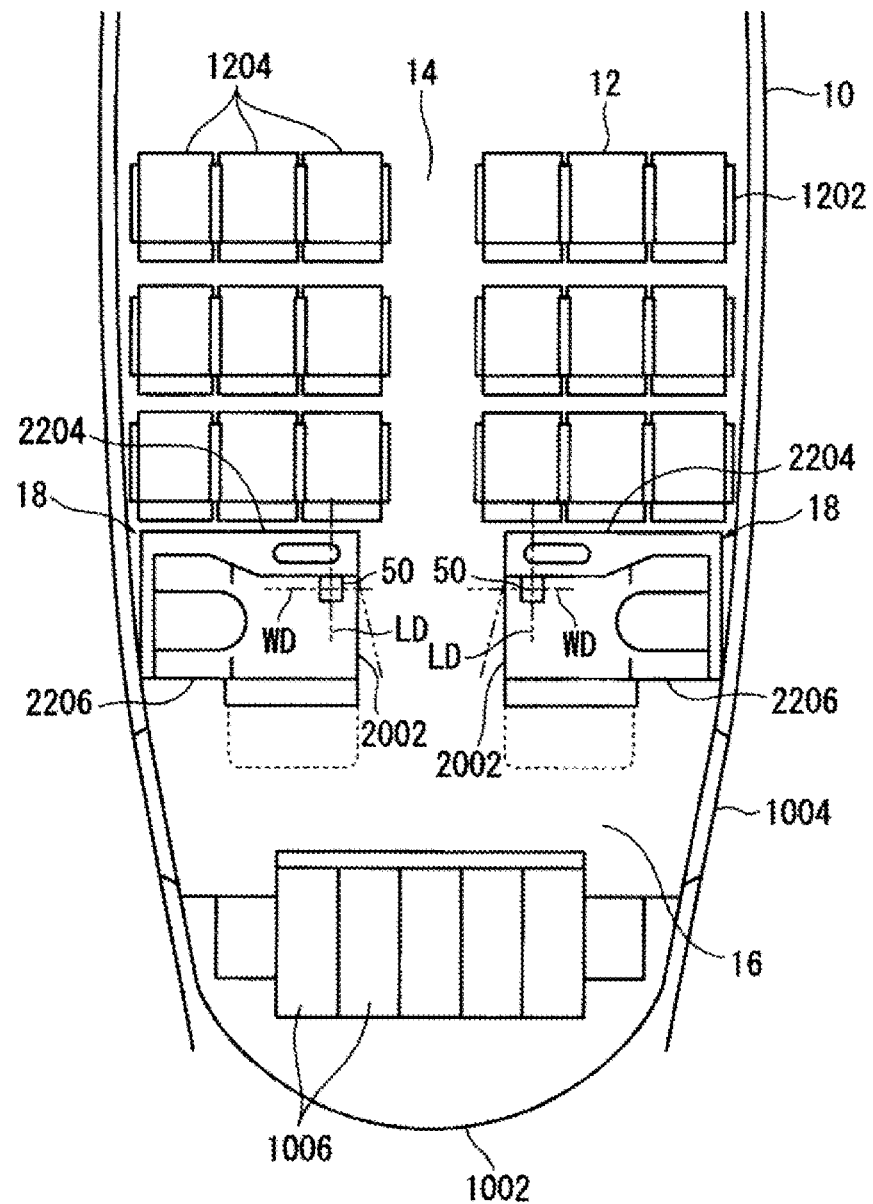
FIG. 1 is a plan view illustrating the relationship between an aircraft lavatory unit installed in an aircraft, an aisle, and a group of seats.

As illustrated in FIG. 1, seat groups 12 are provided in a fuselage 10 of an aircraft, and additionally a longitudinal aisle 14 and a latitudinal aisle 16 are provided.

The front part of the fuselage 10 is a control room and the rear part is a pressure bulkhead 1002.

The longitudinal aisle 14 extends in the longitudinal direction of the fuselage 10 at the center of the fuselage 10.

The seat groups 12 are provided on both left and right sides of the longitudinal aisle 14, and each seat group 12 includes a plurality of seat rows 1202 arranged in the longitudinal direction of the fuselage 10 and extending along the longitudinal aisle 14.

Each seat row 1202 includes a plurality of seats 1204 arranged in the width direction of the fuselage 10 and facing the front of the fuselage 10. In the present embodiment, the seat row 1202 is configured by arranging three seats 1204 in the horizontal direction.

The latitudinal aisle 16 extends in the width direction of the fuselage 10 from a boarding gate 1004 at the rear of the fuselage 10 behind the seat row 1202 located at the rear end of the seat group 12, and is connected perpendicularly to the longitudinal aisle 14.

Galleys 1006 are provided at the front side of the pressure bulkhead 1002 and at the rear side of the latitudinal aisle 16 and arranged in the width direction of the fuselage 10.

The aircraft lavatory units 18 are disposed on both sides of the longitudinal aisle 14 and at the rear side of the seat rows 1202 located at rear ends of the respective seat groups 12, and at the front side of the latitudinal aisle 16.

Figure 2:
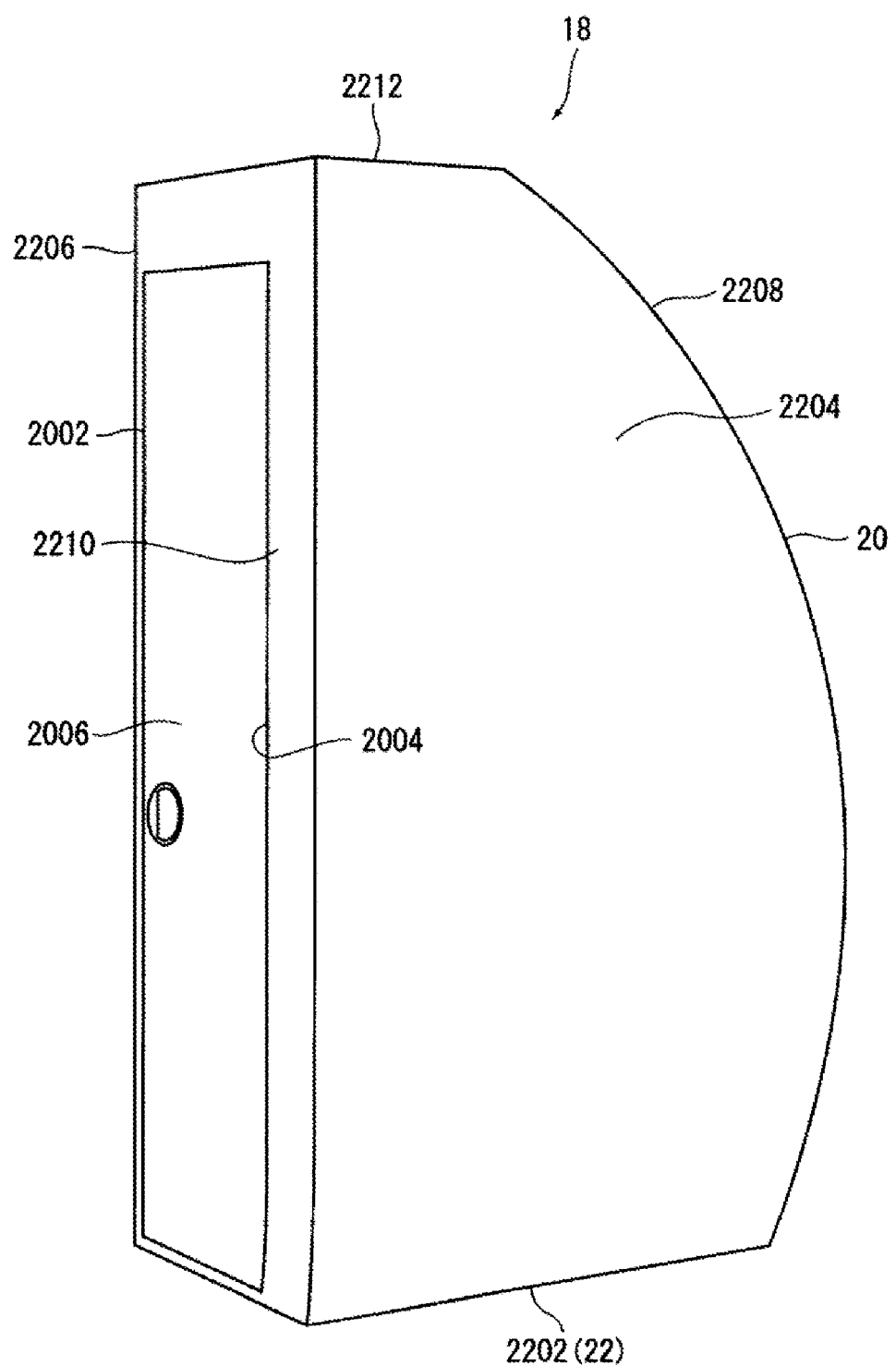
FIG. 2 is a perspective view of an aircraft lavatory unit.
Figure 3:
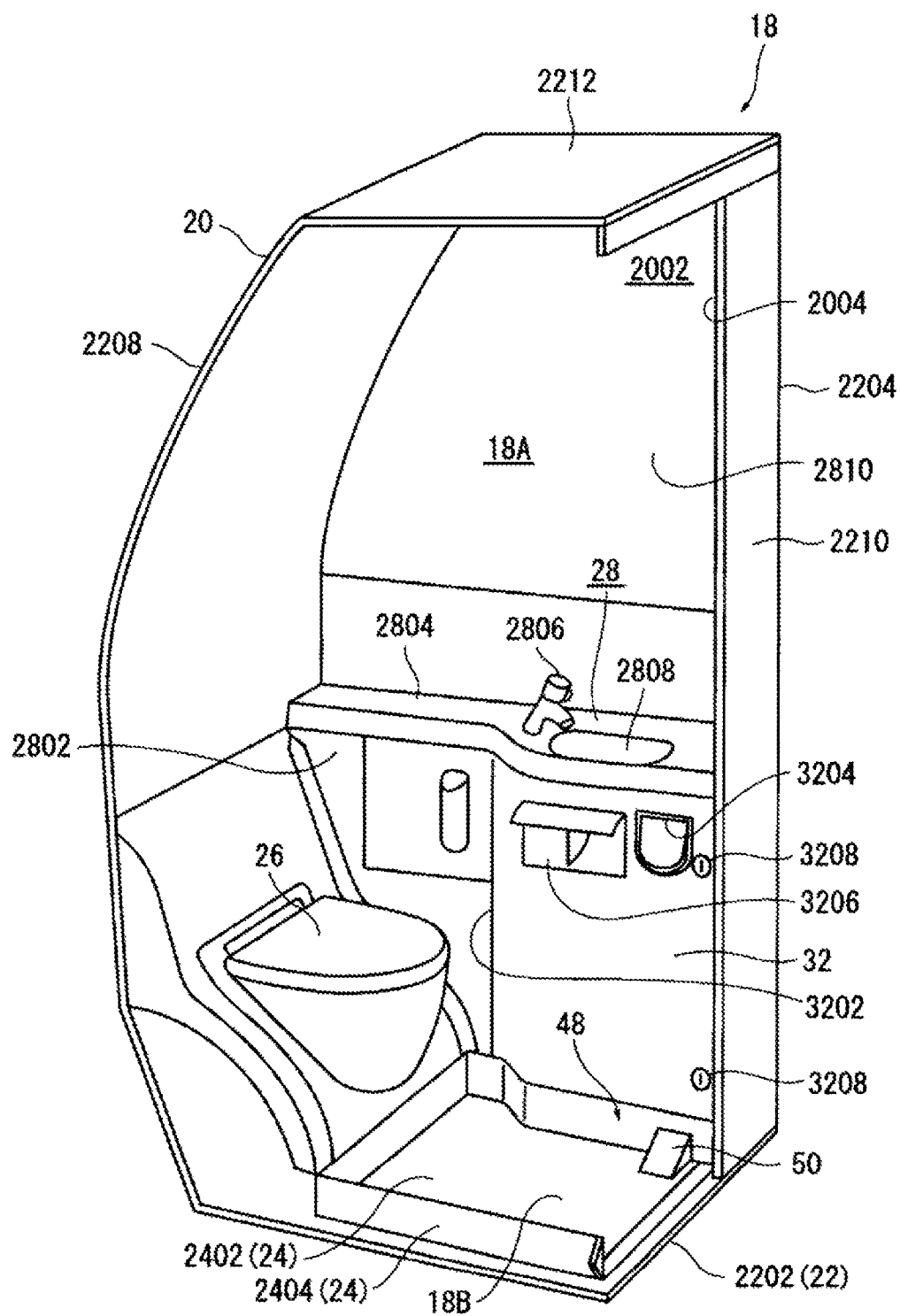
FIG. 3 is a perspective view of the aircraft lavatory unit in which one frame side wall and a door are omitted.

As illustrated in FIGS. 2 and 3, the body frame 20 of the aircraft lavatory unit 18 includes a plurality of frame walls 22 forming a lavatory 18A. The frame walls 22 include a frame bottom wall 2202, a first frame side wall 2204 and a second frame side wall 2206 facing each other and standing parallel to each other from the frame bottom wall 2202, a frame rear wall 2208 connecting one set of ends of the side walls 2204 and 2206, a frame front wall 2210 connecting the other set of ends of the side walls 2204 and 2206, and a frame ceiling wall 2212.

As illustrated in FIG. 1, the first frame side wall 2204 is disposed adjacent to the seat row 1202 located at the rear end behind the seat row 1202 located at the rear end of the seat group 12, and the second frame side wall 2206 is disposed by facing the latitudinal aisle 16.

As illustrated in FIGS. 1 and 2, an entrance 2002 is provided in the frame front wall 2210. The entrance 2002 is constituted by an opening 2004 formed in the frame front wall 2210 and a door 2006 that opens and closes the opening 2004. The front wall 2210 provided with the entrance 2002 is disposed to face the longitudinal aisle 14.

As illustrated in FIG. 3, a floor 18B of the lavatory 18A is formed on the upper surface of the floor pan 24 placed on the frame bottom wall 2202, and a toilet bowl 26, a sink 28, and a waste disposal device 30 (see FIG. 4) are disposed in the lavatory 18A.

The floor pan 24 includes a bottom portion 2402 that constitutes the floor 18B of the lavatory 18A, and a side surface portion 2404 standing from the periphery of the bottom surface portion 2402.

The toilet bowl 26 is disposed in front of the frame rear wall 2208, and the sink 28 is provided on the upper surface of a base 2802 installed inside the first frame side wall 2204. The sink 28 includes a counter 2804, a faucet 2806, a hand wash bowl 2808, and a mirror 2810.

Figure 4:
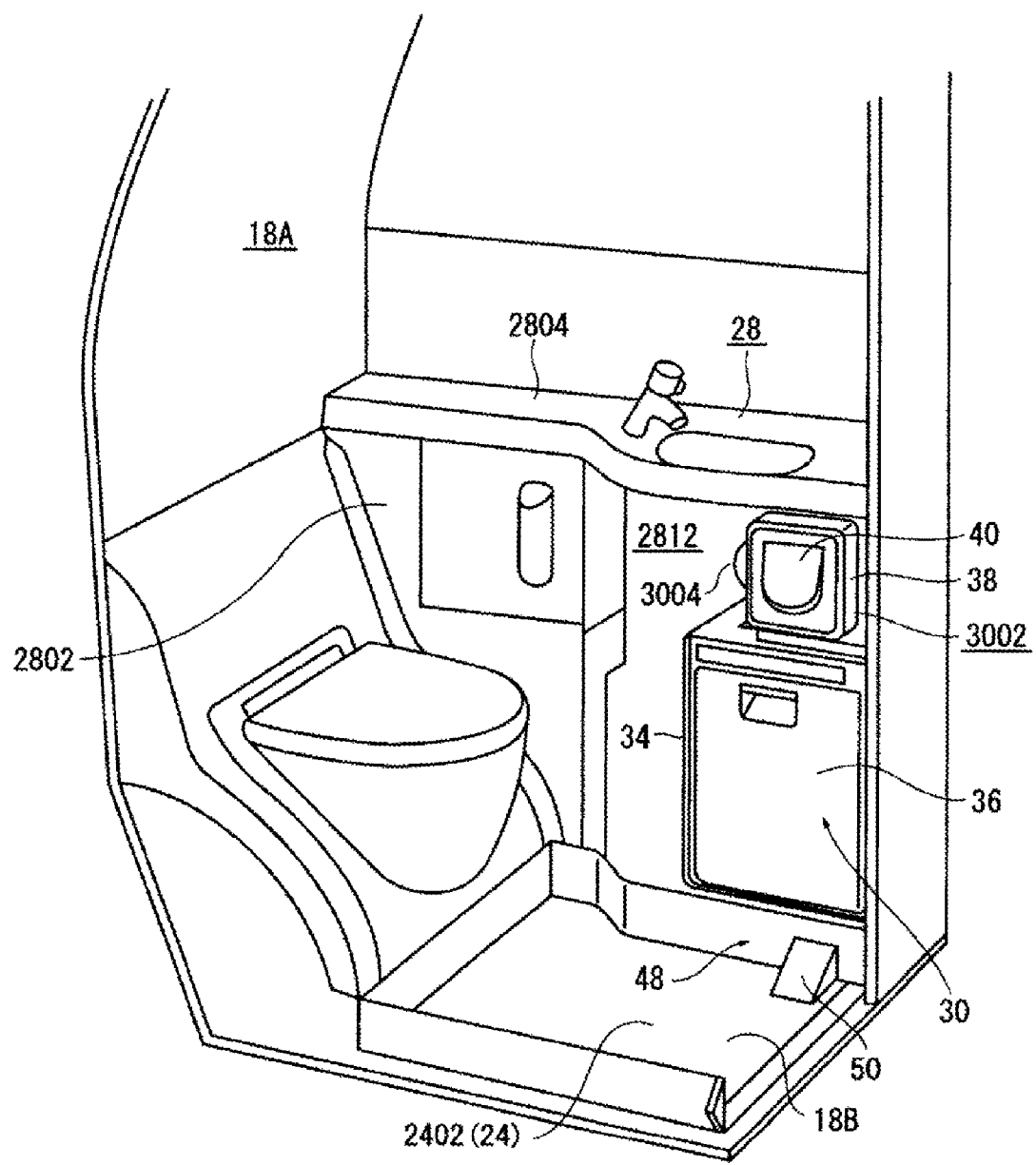
FIG. 4 is a perspective view of the aircraft lavatory unit in which an opening/closing plate that opens and closes a receiving chamber is omitted.

As illustrated in FIG. 4, a receiving chamber 2812 in which the waste disposal device 30 is received is provided inside the base 2802 on the floor 18B.

As illustrated in FIG. 3, a portion of the wall portion that partitions the receiving chamber 2812 and extends below the sink 28 is provided as an opening/closing plate 32 that opens and closes the receiving chamber 2812 below the sink 28. One side portion 3202 in the width direction of the opening/closing plate 32 swings by using a hinge as a fulcrum.

A trash feeding port 3204 is formed and a housing portion 3206 for toilet paper is formed, in the upper portion of the opening/closing plate 32.

In addition, in a state in which the receiving chamber 2812 is closed by the opening/closing plate 32, a latch with a lock 3208 that engages with the striker on the base 2802 side is provided on the other side in the width direction of the opening/closing plate 32. For prevention of mischief and terrorism, the opening/closing plate 32 has a structure that cannot be easily opened.

Figure 5:
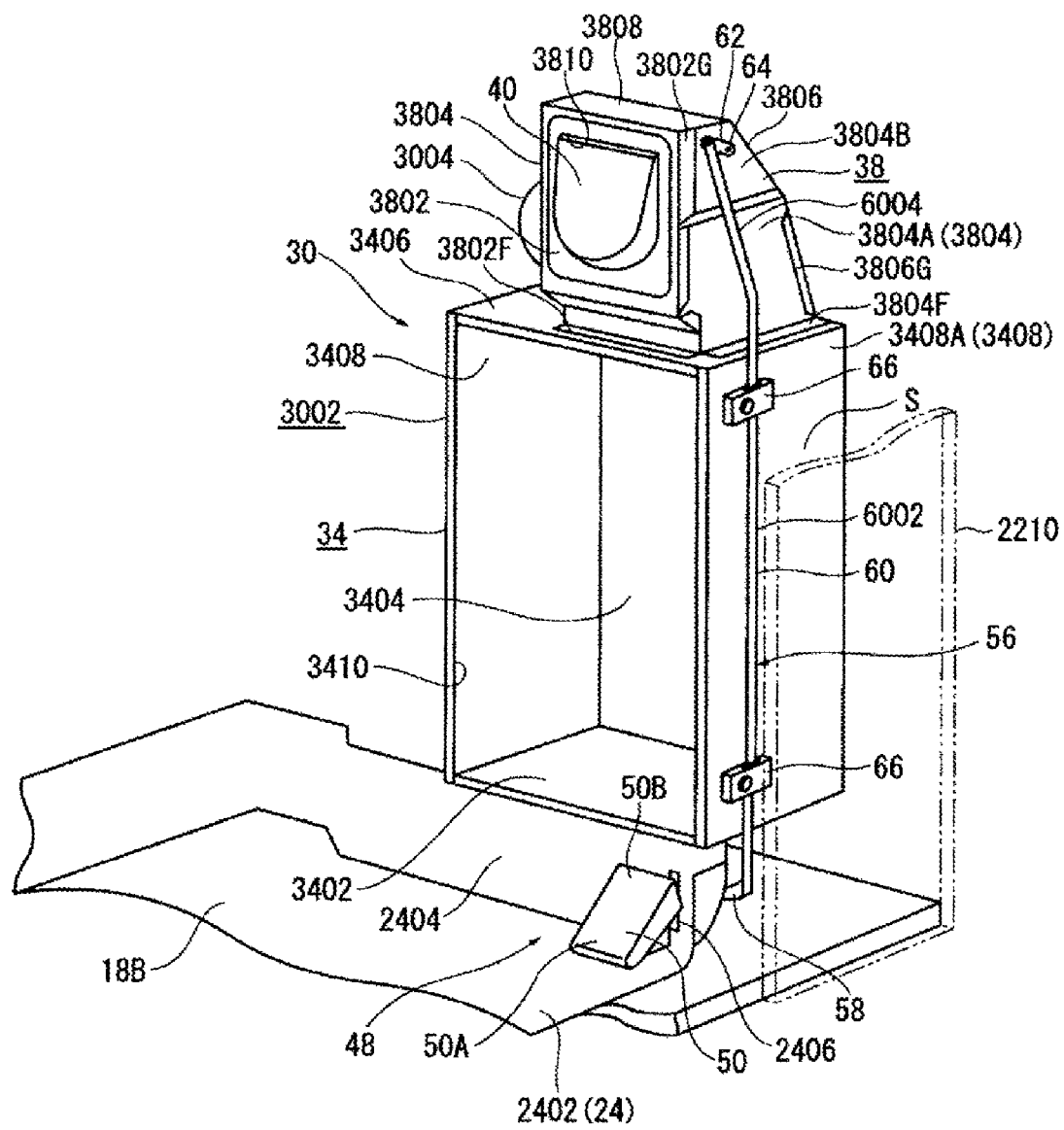
FIG. 5 is a perspective view of a portion of a floor pan and a waste compartment.
Figure 8:
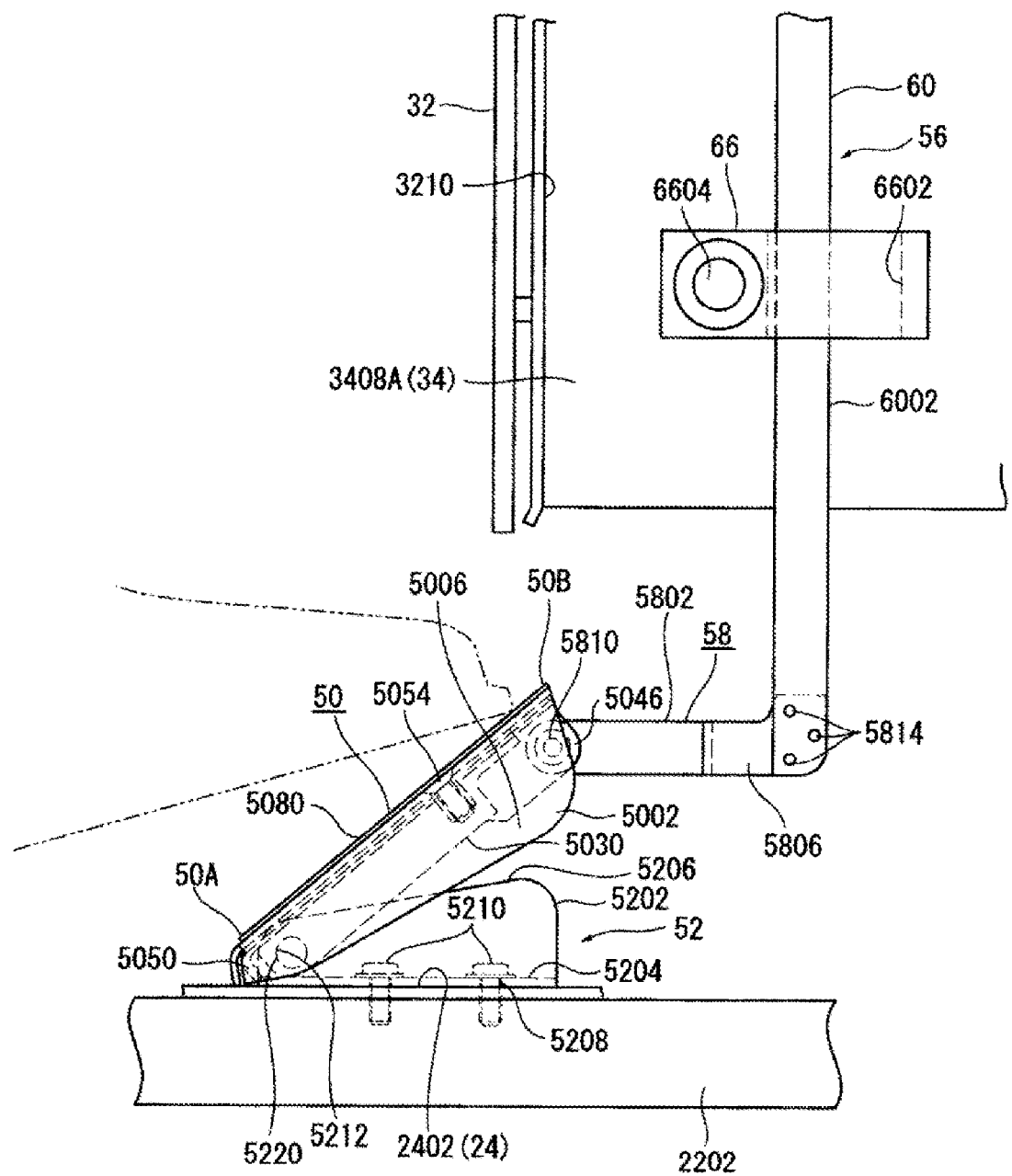
FIG. 8 is a side view of a lower portion of a connection mechanism and a foot pedal support mechanism in a state where the foot pedal is located at the upper limit position.

The waste disposal device 30 configured by including a waste compartment assembly 3002 illustrated in FIGS. 4 and 5, a pressure plate 3210 provided on the opening/closing plate 32 illustrated in FIG. 8, and a fire extinguisher 3004 illustrated in FIGS. 4 and 5.

The waste compartment assembly 3002 includes a waste compartment 34, a waste container 36, a chute 38 and a waste flap 40.

The waste compartment 34, the waste container 36, the chute 38, the waste flap 40, and the pressure plate 3210 are formed of fire-resistant materials, and metal materials represented by aluminum, a flame-retardant resin or the like can be used as such a material, for example.

As illustrated in FIG. 5, the waste compartment 34 includes a compartment bottom wall 3402, a compartment rear wall 3404 standing from the end of the compartment bottom wall 3402 near the first frame side wall 2204, a compartment upper wall 3406 facing the compartment bottom wall 3402 below the counter 2804, and compartment side walls 3408 on both sides that connect both edges of the compartment bottom wall 3402, the compartment rear wall 3404, and the compartment upper wall 3406. An opening portion 3410 for inserting and removing the waste container 36 is provided on the lavatory 18A side of the waste compartment 34.

A plurality of sections of the compartment rear wall 3404 are attached to the first frame side wall 2204 with screws. Moreover, a plurality of sections of the compartment side wall 3408A located on the side of the frame front wall 2210 are attached to the frame front wall 2210 with screws with spacers interposed therebetween. In this way, the waste compartment 34 is disposed in the receiving chamber 2812, the compartment bottom wall 3402 is located at a section upwardly separated from the frame bottom wall 2202, and an opening portion 3410 faces the second frame side wall 2206.

A compartment side wall 3408A is disposed adjacent to the frame front wall 2210, and a small gap S is provided between the compartment side wall 3408A and the frame front wall 2210.

The gap S is covered with the counter 2804, and the space S is covered with respect to the inside of the lavatory 18A in a state in which the receiving chamber 2812 is closed by the opening/closing plate 32.

As illustrated in FIG. 5, the chute 38 is erected on the compartment upper wall 3406.

The chute 38 includes a chute front wall 3802 located on the opening/closing plate 32 side, chute side walls 3804 on both sides, a chute rear wall 3806 located near the first frame side wall 2204 and a chute upper wall 3808. These walls are formed of a thin plate material, and the chute rear wall 3806 and the chute upper wall 3808 are formed of a single plate material.

A trash feeding opening 3810 is formed at a section of the chute front wall 3802 corresponding to the trash feeding port 3204 of the opening/closing plate 32.

In FIG. 5, reference numerals 3802F and 3804F indicate the flanges of the chute front wall 3802 and the chute side wall 3804 which are attached to the compartment upper wall 3406 of the waste compartment 34 with screws. Reference numerals 3802G and 3806G indicate the flanges of the chute front wall 3802 and the chute rear wall 3806 which are attached to the chute side wall 3804 with screws.

The width between the chute side walls 3804 on both sides is the minimum dimension sufficient to swing the waste flap 40.

One chute side wall 3804A of the chute side walls 3804 on both sides is disposed adjacent to the frame front wall 2210. An expanded wall 3804B, in which the width between the chute side walls 3804 on both sides is widened, is provided so that an inner arm 74 of the waste flap swing mechanism 54, which will be described later, is disposed above the chute side wall 3804A near the frame front wall 2210.

The internal space of the chute 38 communicates with the internal space of the waste compartment 34 through an opening (not illustrated) provided in the compartment upper wall 3406.

The fire extinguisher 3004 is provided on the compartment upper wall 3406.

The fire extinguisher 3004 injects a fire-extinguishing agent from the injection nozzle toward the inside of the waste container 36 housed in the waste compartment 34 when a temperature is reached at a set temperature or more. A known inert gas, such as chlorofluorocarbon gas or halon gas, can be used as the fire-extinguishing agent, and a commercially available product can be used for the fire extinguisher 3004.

Figure 17:
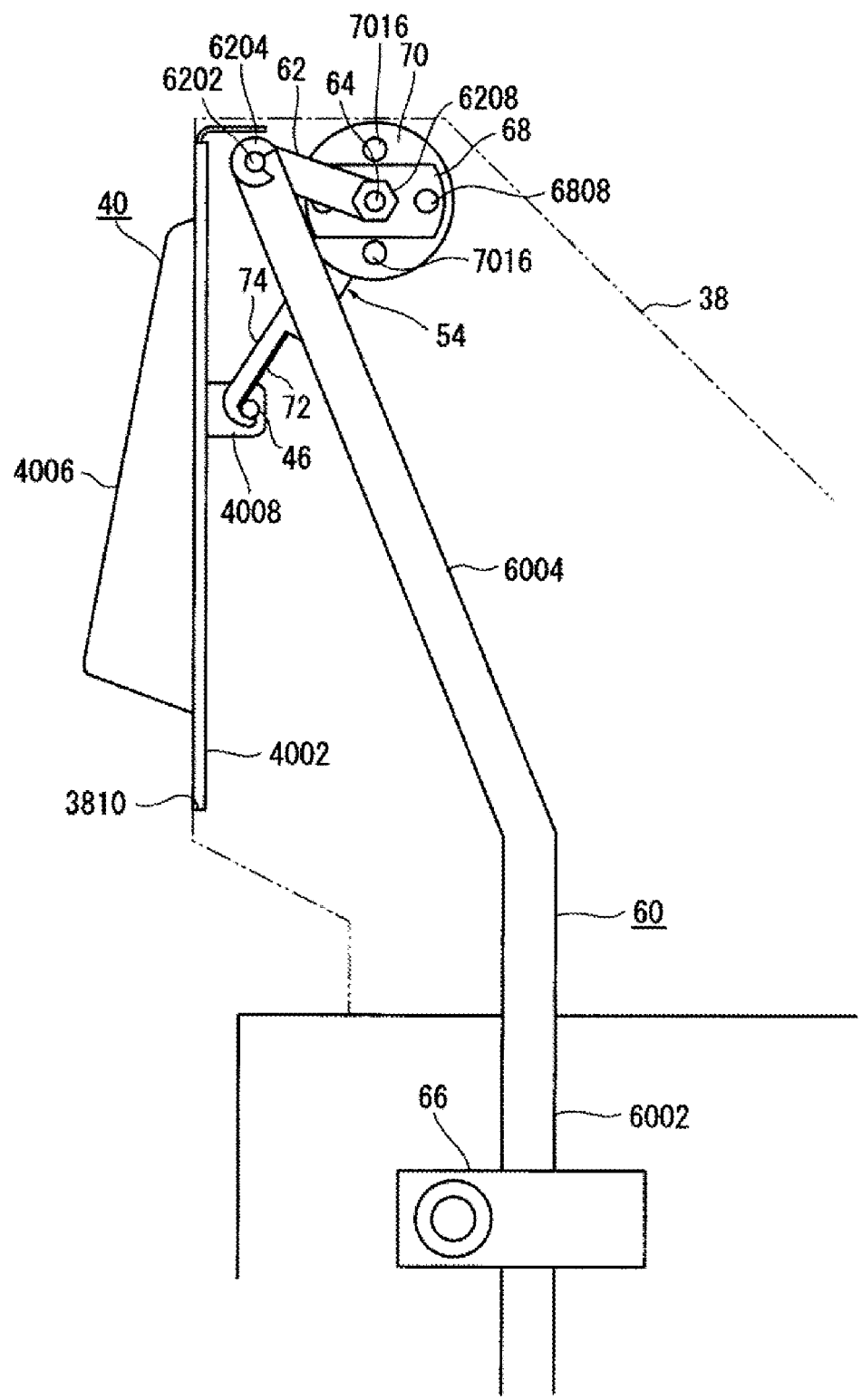
FIG. 17 is a side view of an upper portion of the connection mechanism and a waste flap swing mechanism in a state where the foot pedal is located at the upper limit position.
Figure 18:
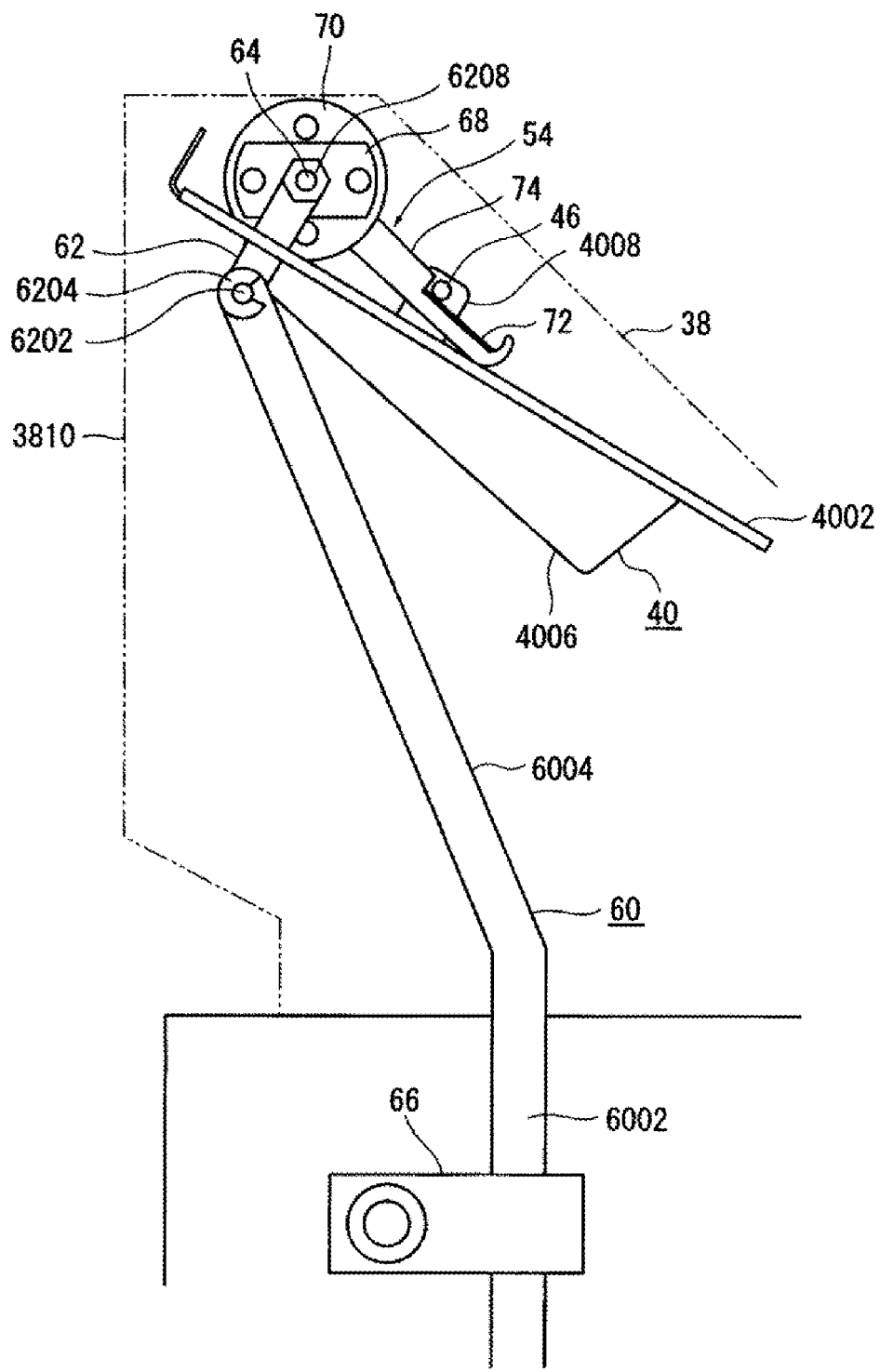
FIG. 18 is a side view of an upper portion of the connection mechanism and the waste flap swing mechanism in a state where the foot pedal is located at the lower limit position.

The waste flap 40 opens and closes the trash feeding opening 3810, and can swing between a closed position for closing the trash feeding opening 3810 as illustrated in FIG. 17 and an opened position for opening the trash feeding opening 3810 as illustrated in FIG. 18.

Figure 6:
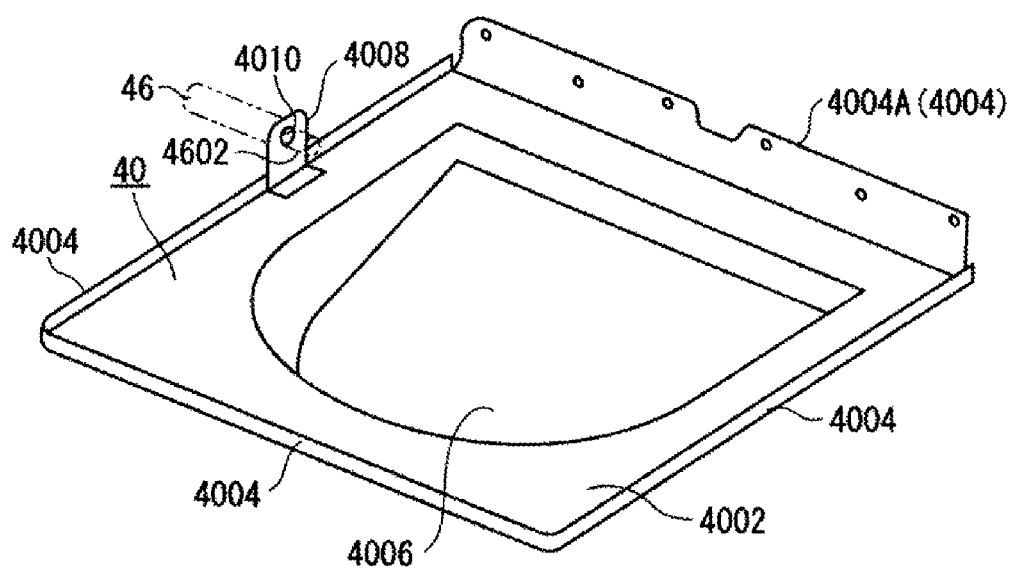
FIG. 6 is a perspective view of a waste flap.

As illustrated in FIG. 6, the waste flap 40 includes a rectangular board portion 4002 and flanges 4004 standing from four sides of the board portion 4002. An expanded portion 4006 inserted into the trash feeding opening 3810 is formed at the center of the board portion 4002.

As illustrated in FIGS. 3 and 17, when the waste flap 40 is in the closed position, the expanded portion 4006 is inserted into the trash feeding opening 3810 and the trash feeding port 3204 of the opening/closing plate 32 and protrudes outside the chute 38 and the opening/closing plate 32, and the outer surface of the board portion 4002 abuts against the inner surface of the chute front wall 3802.

With the receiving chamber 2812 closed by the opening/closing plate 32, the opening portion 3410 of the waste compartment 34 is closed by the pressure plate 3210 provided on the opening/closing plate 32. In this state, when the trash feeding opening 3810 is closed by the waste flap 40, a fire spreading prevention space that satisfies the Fire Containment requirements specified in United States Federal Aviation Regulations (FAR)25.853 is formed from the chute 38 to the waste compartment 34. Thus, when trash fed into the trash feeding opening 3810 burns, spreading of fire to the outside of the waste compartment assembly 3002 is prevented.

Figure 7:
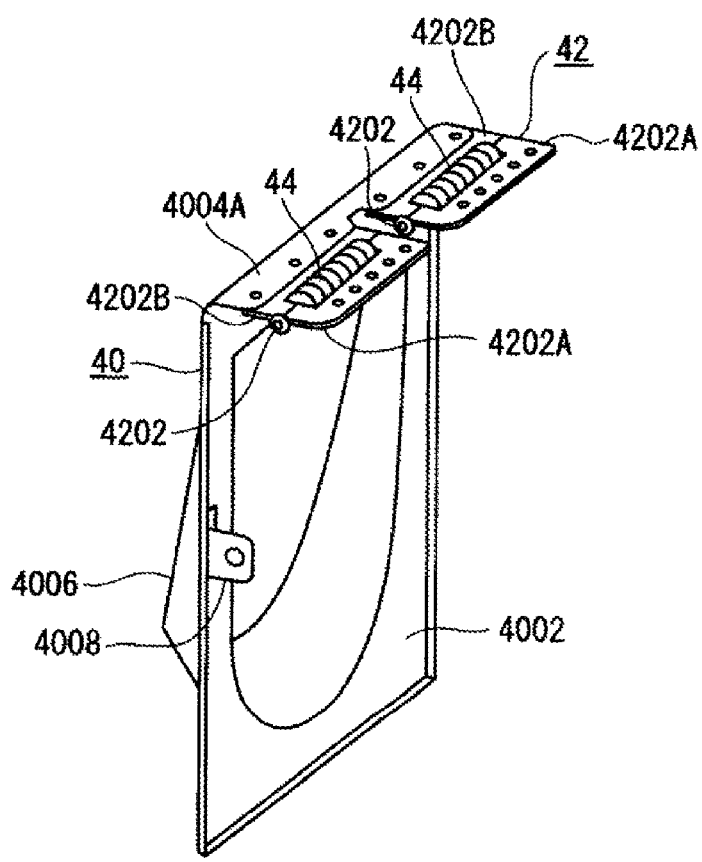
FIG. 7 is a perspective view of a hinge mechanism that supports the waste flap.

As illustrated in FIG. 6, the flange 4004A disposed in the upper portion is formed to have a longer protruding length than the flanges 4004 provided at other sections. As illustrated in FIG. 7, a hinge mechanism 42 is provided to swingably support the waste flap 40 between the flange 4004A and the chute upper wall 3808. Moreover, a torsion spring 44 is provided to constantly bias the waste flap 40 in the direction of closing the trash feeding opening 3810.

The hinge mechanism 42 is constituted by two hinges, and each hinge is constituted by a pair of hinge pieces 4204A and 4204B that are swingably coupled with the support shaft 4202.

Two torsion springs 44 are provided and attached to the support shafts 4202 of the hinge mechanisms 42.

One hinge piece 4204A of the pair of hinge pieces 4204A and 4204B of each hinge is attached to the lower surface of the chute upper wall 3808, and the other hinge piece 4204B is attached to the lower surface of flange 4004A. In this way, the waste flap 40 is swingably provided on the chute 38 via the hinge mechanism 42, and is constantly biased in the direction of closing the trash feeding opening 3810 by the torsion spring 44.

As illustrated in FIGS. 6, 17, and 18, in a state where the waste flap 40 is assembled into the chute 38 via the hinge mechanism 42, an attachment piece 4008 is erected from the inner surface of the board portion 4002 at a section close to the flange 4004 located on the frame front wall 2210 side.

As indicated by an imaginary line in FIG. 6, an engaged pin 46 is provided as an engaged portion protruding toward the chute side wall 3804A through a hole 4010 at the tip of the attachment piece 4008.

The engaged pin 46 is attached by inserting a male thread portion 4602 protruding from the base portion of the engaged pin 46 into the hole 4010 at the tip of the attachment piece 4008 and screwing a nut (not illustrated) onto the male thread portion 4602.

Next, a foot pedal-type waste flap opening/closing mechanism 48 will be described.

As illustrated in FIGS. 3 and 4, the foot pedal-type waste flap opening/closing mechanism 48 swings the waste flap 40 from the closed position to the opened position by stepping on the foot pedal 50 on the floor 18B.

Figure 9:
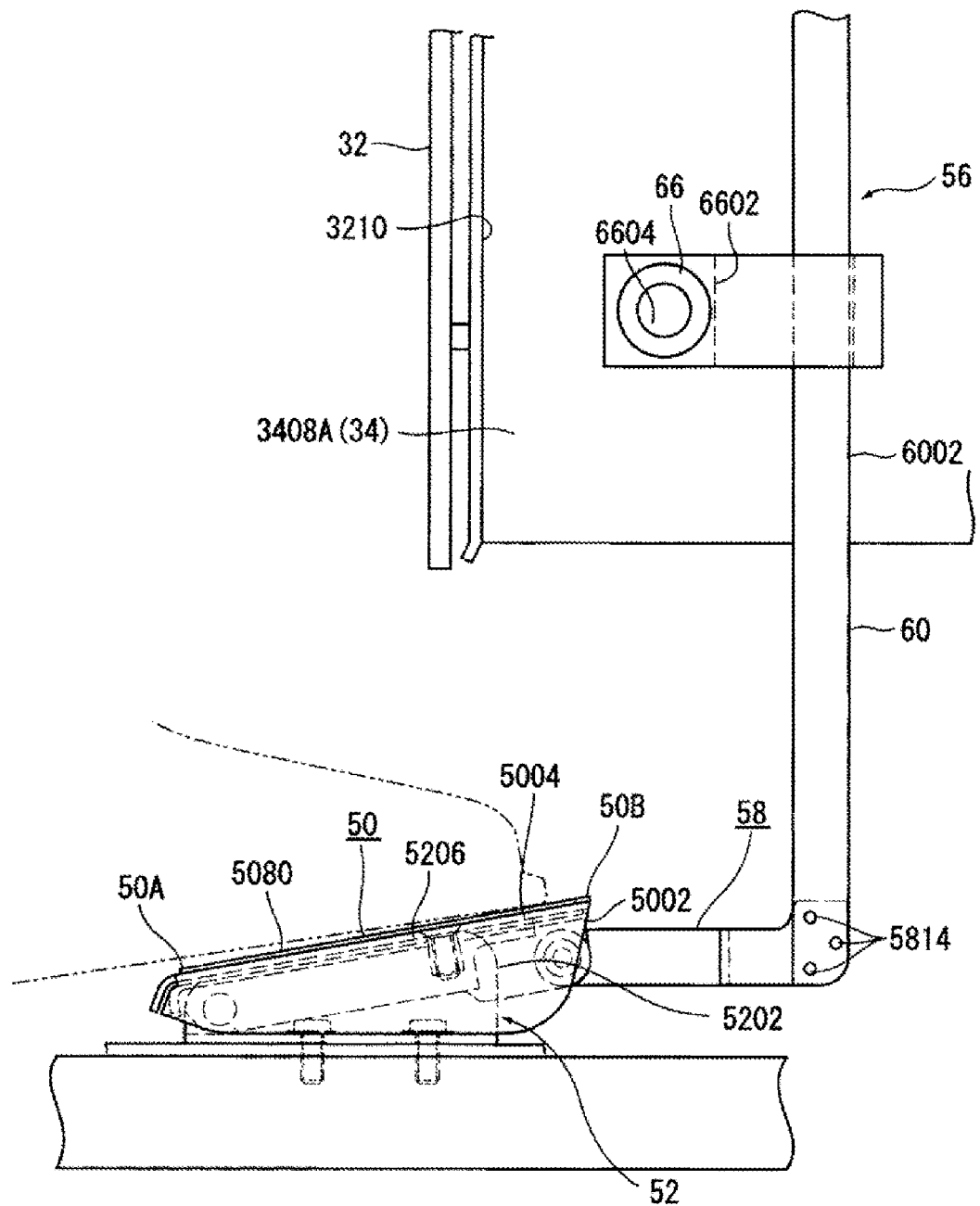
FIG. 9 is a side view of a lower portion of a connection mechanism and a foot pedal support mechanism in a state where the foot pedal is located at the lower limit position.

The foot pedal-type waste flap opening/closing mechanism 48 includes a foot pedal support mechanism 52 illustrated in FIGS. 8 and 9, a waste flap swing mechanism 54 illustrated in FIGS. 17 and 18, and a connection mechanism 56 illustrated in FIG. 5.

Figure 10:
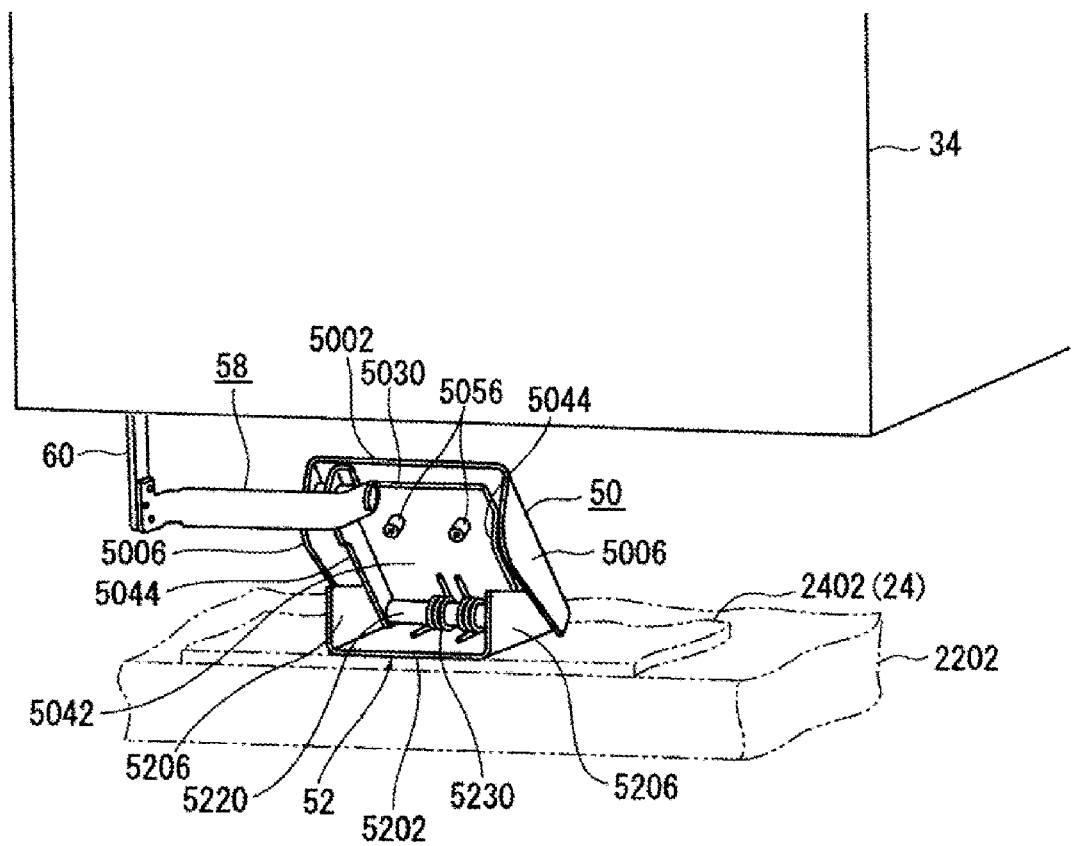
FIG. 10 is a perspective view of a lower portion of a connection mechanism and a foot pedal support mechanism in a state where the foot pedal is located at the upper limit position.
Figure 11A:
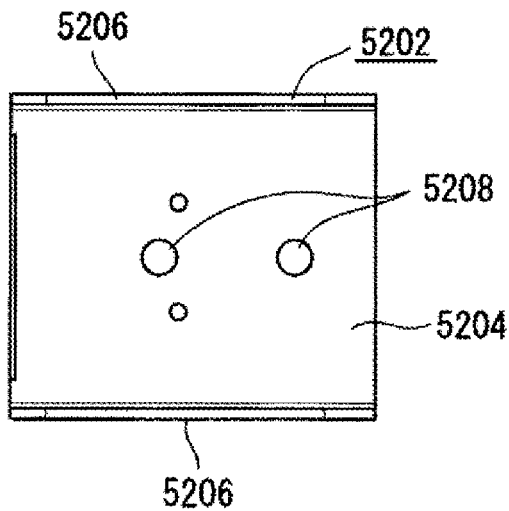
Figure 11B:
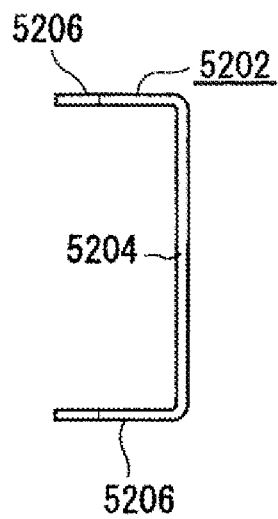
Figure 11C:
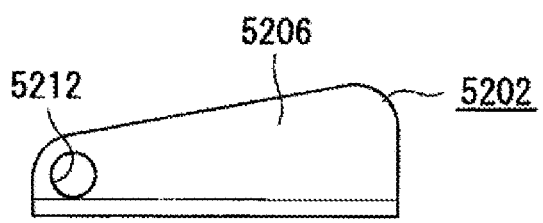
Figure 11D:
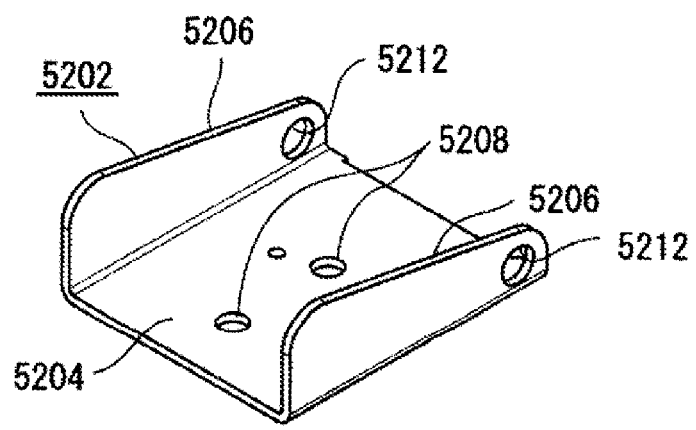
Figure 12A:
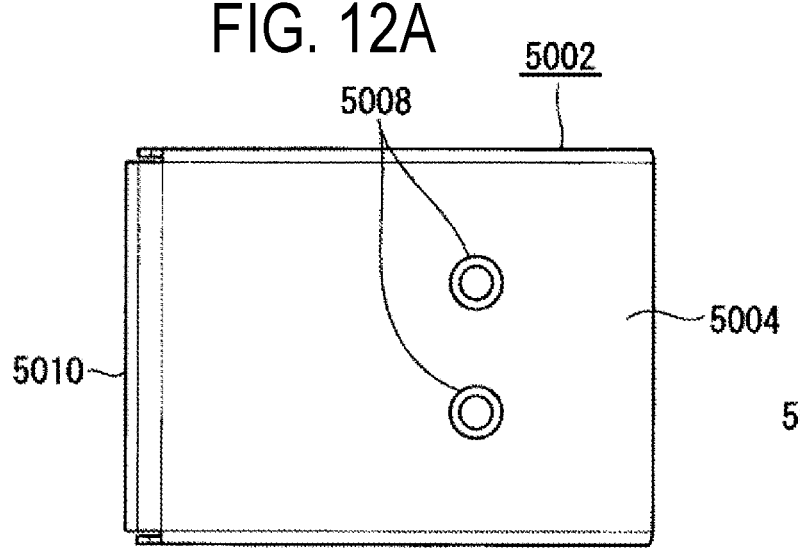
Figure 12B:
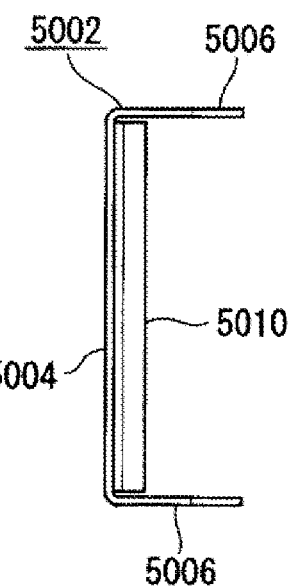
Figure 12C:
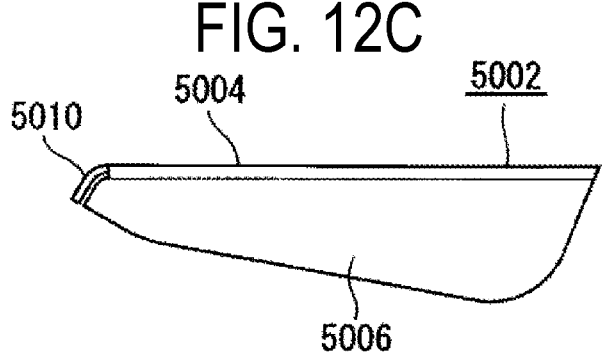
Figure 12D:
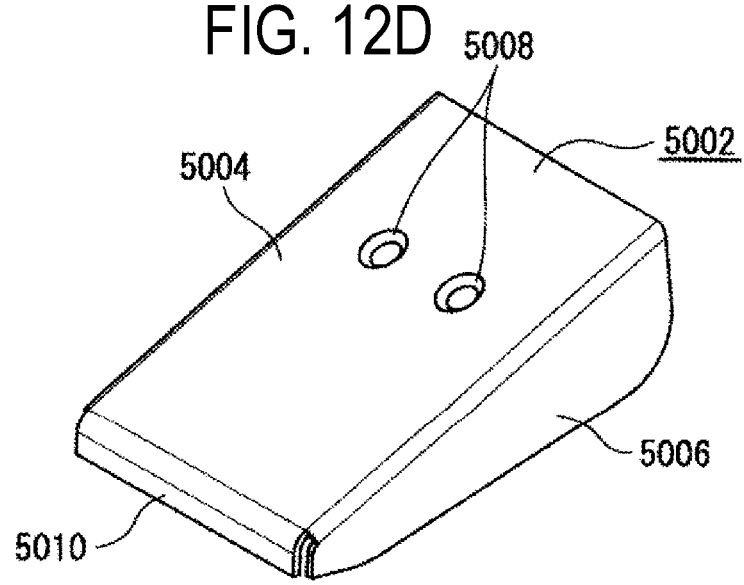
Figure 13A:
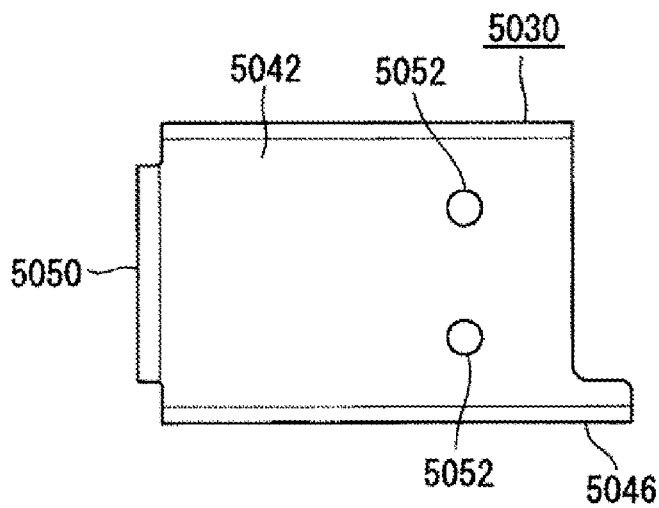
Figure 13B:
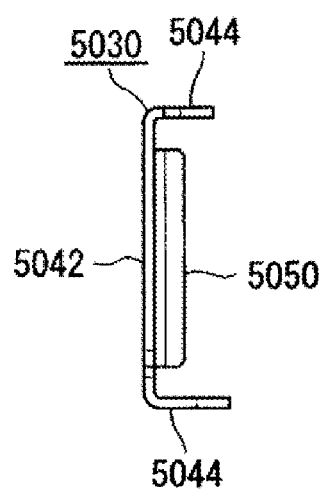
Figure 13C:
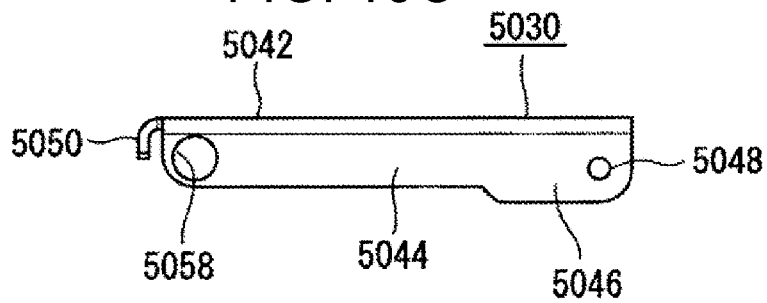
Figure 13D:
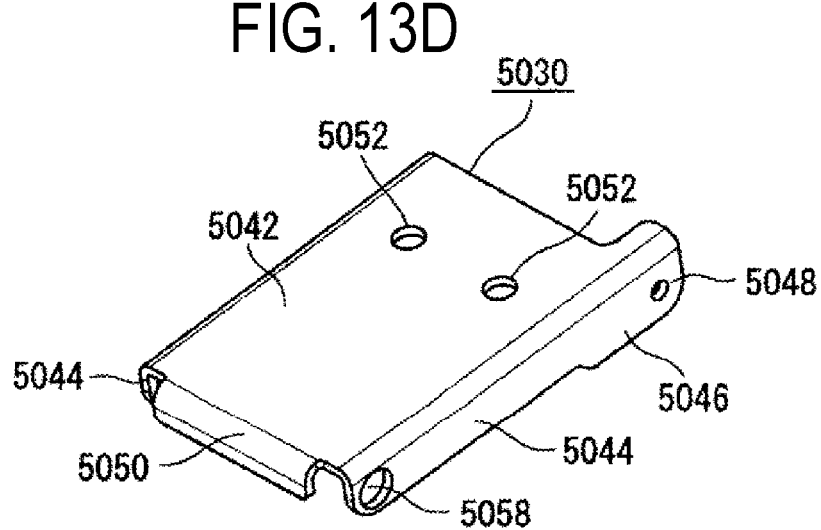

As illustrated in FIGS. 8 and 9, the foot pedal support mechanism 52 includes a lower member 5202, a support shaft 5220, and a torsion spring 5230 illustrated in FIG. 10.

The foot pedal support mechanism 52 swingably supports the foot pedal 50 between an upper limit position illustrated in FIG. 8 where the foot pedal 50 can be stepped on and a lower limit position illustrated in FIG. 9 where the foot pedal 50 is stepped on from the upper limit position, and biases the foot pedal 50 allowing the foot pedal to be positioned at the upper limit position.

The foot pedal 50 is disposed close to a section directly below the waste compartment 34.

The foot pedal 50 includes a foot pedal front end 50A away from the waste compartment 34 and a foot pedal rear end 50B disposed directly below the waste compartment 34.

The foot pedal support mechanism 52 is configured such that, at the upper limit position, the foot pedal 50 is inclined and supported so that the foot pedal rear end 50B is located above the foot pedal front end 50A, and the foot pedal rear end 50B swings in the vertical direction by using the foot pedal front end 50A as a fulcrum.

As illustrated in the plan view of FIG. 1, the foot pedal 50 has a longitudinal direction LD along a direction connecting the foot pedal front end 50A and the foot pedal rear end 50B and a width direction WD along a direction orthogonal to the longitudinal direction LD.

The longitudinal direction LD of the foot pedal 50 extends in the extension direction of the seat group 12, which is the direction in which the seat rows 1202 are arranged, and the width direction WD of the foot pedal 50 extends in a direction orthogonal to the extension direction of the longitudinal aisle 14.

As illustrated in FIG. 8, the foot pedal 50 includes an upper member 5002, an intermediate member 5030, and a decorative plate 5080.

The upper member 5002, the intermediate member 5030, and the lower member 5202 constituting the foot pedal support mechanism 52 are formed of metal or synthetic resin. The support shaft 5220 and the torsion spring 5230 constituting the foot pedal support mechanism 52 are formed of metal.

The lower member 5202 is disposed on the bottom surface portion 2402 of the floor pan 24 close to a section directly below the waste compartment 34.

As illustrated in FIGS. 11A-11D, the lower member 5202 includes a lower surface portion 5204 placed on the bottom surface portion 2402 of the floor pan 24 and lower side surface portions 5206 that stand from both sides of the lower surface portion 5204.

A plurality of bolt insertion holes 5208 is formed in the lower surface portion 5204.

As illustrated in FIG. 8, the lower surface portion 5204 is placed on the bottom surface portion 2402 of the floor pan 24 and attached to the frame bottom wall 2202 by bolts 5210 inserted through the bolt insertion holes 5208.

By providing the lower member 5202 constituting the foot pedal support mechanism 52 on the bottom surface portion 2402 of the floor pan 24 in this manner, it is designed to be easily applied to an existing aircraft lavatory unit 18.

As illustrated in FIG. 8, the height of the upper edge of the lower side surface portion 5206 is formed to be the lowest at the front end away from the waste compartment 34 and gradually increases as it approaches a section directly below the waste compartment 34, and the rear end located directly below the waste compartment 34 is formed to be the highest.

Support shaft insertion holes 5212 are formed at the front ends of the lower side surface portions 5206 on both sides away from the waste compartment 34, and the support shafts 5220 are inserted through the support shaft insertion holes 5212.

As illustrated in FIG. 8, the intermediate member 5030 is attached to the lower surface of the upper member 5002, and the upper member 5002 swings together with the intermediate member 5030 about the support shaft 5220 between the upper limit position and the lower limit position as a center.

As illustrated in FIGS. 12A-12D, the upper member 5002 includes an upper surface portion 5004 and upper side surface portions 5006 extending vertically from both sides of the upper surface portion 5004.

The upper surface portion 5004 has an elongated shape whose length is greater than its width, and the upper side surface portions 5006 are provided on both sides of the upper surface portion 5004 in the width direction.

The width and length of the upper surface portion 5004 and the dimension between the upper surface portions 5006 on both sides are larger than the width and length of the lower surface portion 5204 of the lower member 5202 and the dimension between the lower side surface portions 5206 on both sides. The upper surface portion 5004 has such a dimension that the upper surface portion 5004 covers the lower surface portion 5204 from the upper side covering the foot pedal support mechanism 52 including the lower member 5202.

As illustrated in FIG. 8, the downward protruding length of the lower edge of the upper side surface portion 5006 is the shortest at the front end away from the waste compartment 34, and gradually increase as it approaches the waste compartment 34, and the length is the largest at the rear end located directly below the waste compartment 34.

As illustrated in FIGS. 12A-12D, a plurality of tapered holes 5008 for receiving the heads of screws for attaching the intermediate member 5030 to the lower surface of the upper surface portion 5004 is formed in the upper surface portion 5004.

An inclined surface portion 5010 that is gradually inclined downward as it moves away from the upper surface portion 5004 is provided at the front end of the upper surface portion 5004 away from the waste compartment 34.

As illustrated in FIGS. 8 and 9, the decorative plate 5080 is provided on the upper surface portion 5004.

The decorative plate 5080 is formed of a material having a large coefficient of friction against the shoe sole, which is rubber or synthetic resin for example, and is attached to the upper surface portion 5004 using an adhesive, screws, or the like.

In the present embodiment, the decorative plate 5080 is a section of the foot pedal 50 that is stepped on by the shoe sole, and the upper surface portion 5004 is a section that is stepped on via the decorative plate 5080.

Although the decorative plate 5080 may be omitted, the provision of the decorative plate 5080 is advantageous in improving the operability of stepping on the foot pedal 50, and in improving the appearance of the foot pedal-type waste flap opening/closing mechanism 48.

As illustrated in FIGS. 13A-13D, the intermediate member 5030 includes, an intermediate upper surface portion 5042 and intermediate side surface portions 5044 vertically provided from both sides of the intermediate upper surface portion 5042.

The intermediate upper surface portion 5042 has an elongated shape whose length is greater than its width, and the intermediate side surface portions 5044 are provided on both sides of the intermediate upper surface portion 5042 in the width direction.

The length of the intermediate upper surface portion 5042 is formed to be larger than the length of the lower surface portion 5204 of the lower member 5202.

The width of the intermediate upper surface portion 5042 and the dimension between the intermediate side surface portions 5044 on both sides are formed to be smaller than the width of the lower surface portion 5204 of the lower member 5202 and the dimension between the lower side surface portions 5206 on both sides.

A protruding portion 5046 protruding toward the frame rear wall 2208 is provided at the end on the frame rear wall 2208 side, in the intermediate side surface portion 5044 disposed on the frame front wall 2210 side among the pair of intermediate side surface portions 5044, and a connecting pin insertion hole 5048 is formed in the protruding portion 5046.

An inclined surface portion 5050 that is gradually inclined downward as it moves away from the intermediate upper surface portion 5042 is provided at the front end of the intermediate upper surface portion 5042 away from the waste compartment 34.

A plurality of screw insertion holes 5052 is formed in the intermediate upper surface portion 5042 that allows attachment to the upper surface portion 5004 of the upper member 5002.

As illustrated in FIG. 8, the intermediate member 5030 is attached to the upper surface portion 5004 by overlaying the upper surface of the intermediate upper surface portion 5042 (see FIGS. 13A-13D) on the lower surface of the upper surface portion 5004 (see FIGS. 12A-12D) of the upper member 5002, inserting the screw 5054 into the tapered hole 5008 and the screw insertion hole 5052, and coupling the nut 5056 with the male thread of the screw 5054 protruding from the lower surface of the intermediate upper surface portion 5042 as illustrated in FIG. 10. In this way, the upper member 5002 and the intermediate member 5030 are integrated.

As illustrated in FIGS. 13A-13D, a support shaft insertion holes 5058 is formed at the front ends of the pair of intermediate side surface portions 5044 away from the waste compartment 34.

The integrated intermediate member 5030 and upper member 5002 are put on the lower member 5202 from above, and in this state, as illustrated in FIG. 10, each of the pair of lower side surface portions 5206 of the lower member 5202 is located between the intermediate side surface portion 5044 of the intermediate member 5030 and the upper side surface portion 5006 of the upper member 5002.

The support shaft 5220 illustrated in FIG. 14 is inserted through the support shaft insertion hole 5212 (see FIG. 11C) of the lower member 5202 and the support shaft insertion hole 5058 (see FIG. 13C) of the intermediate member 5030, and an E-ring (not illustrated) is attached to a groove 5222 of the support shaft 5220 protruding from the lower side surface portion 5206 of the lower member 5202 whereby the intermediate member 5030 is swingably connected to the lower member 5202 via the support shaft 5220. In other words, the foot pedal 50 is swingably connected to the lower member 5202.

The torsion spring 5230 is hooked on the portion of the support shaft 5220 located on the lower surface of the intermediate upper surface portion 5042 of the intermediate member 5030, and the rear end of the intermediate member 5030 located directly below the waste compartment 34 is constantly biased upward by using the support shaft 5220 as a fulcrum.

In a state where the foot pedal 50 is supported by the foot pedal support mechanism 52 in this manner, the upper member 5002 covers the lower member 5202, the support shaft 5220, and the torsion spring 5230 together with the intermediate member 5040. That is, the upper member 5002 covers the foot pedal support mechanism 52. Thus, it is advantageous in improving the operability of stepping on the foot pedal 50, improving the appearance of the foot pedal-type waste flap opening/closing mechanism 48, and preventing troubles such as shoes getting caught under the foot pedal 50.

As illustrated in FIG. 8, the foot pedal 50 is configured such that the tip of the inclined surface portion 5050 of the intermediate member 5030 abuts the tip of the lower surface portion 5204 of the lower member 5202 so that the foot pedal 50 is at the upper limit position where the end of the upper member 5002 away from the support shaft 5220 is at the highest position. And thus the foot pedal 50 is constantly biased by the torsion spring 5230 allowing the foot pedal to be located at the upper limit position.

The foot pedal 50 is configured such that the foot pedal rear end 50B moves down by stepping on the decorative plate 5080 with the shoe sole and the lower surface of the upper surface portion 5004 of the upper member 5002 abuts the upper edge of the pair of the lower side surface portions 5206 of the lower member 5202, whereby the foot pedal 50 is at the lower limit position where the foot pedal rear end 50B is at the lowest position.

Accordingly, the foot pedal support mechanism 52 is configured such that, at the upper limit position, the foot pedal 50 is supported being inclined so that the foot pedal rear end 50B located directly below the waste compartment 34 is located above the foot pedal front end 50A away from the waste compartment 34, and the foot pedal rear end 50B swings downward by using the foot pedal front end 50A as a fulcrum by stepping on the foot pedal 50.

Further, in the present embodiment, as illustrated in FIG. 8, the foot pedal rear end 50B is located below the waste compartment 34 and the opening/closing plate 32 that closes the receiving chamber 2812 and the opening portion 3410 of the waste compartment 34. In a plan view, the foot pedal rear end 50B overlaps at least the contour of the opening/closing plate 32 in a state in which the receiving chamber 2812 and the opening portion 3410 are closed.

Next, the connection mechanism 56 that connects the foot pedal support mechanism 52 and the waste flap swing mechanism 54 will be described.

As illustrated in FIG. 5, the connection mechanism 56 includes a lower arm 58, a connecting member 60, an outer arm 62, and a rotating shaft 64.

As illustrated in FIGS. 8 to 10, the lower arm 58 is extending below the waste compartment 34 and swings integrally with the foot pedal 50.

As illustrated in FIGS. 5 and 15, the lower arm 58 includes a first longitudinal portion 5802 connected to the foot pedal 50 and extending in the longitudinal direction of the foot pedal 50 through a notch 2406 of the side surface portion 2404 of the floor pan 24 to reach below the waste compartment 34, a lateral portion 5804 extending from the first longitudinal portion 5802 directly downward below the gap S, and a second longitudinal portion 5806 extending from the end of the lateral portion 5804 directly below the gap S in a direction away from the foot pedal 50 in parallel to the first longitudinal portion 5802.

As illustrated in FIG. 8, the tip of the first longitudinal portion 5802 is swingably connected to the protruding portion 5046 of the intermediate member 5030 via an E-ring (not illustrated) and a connecting pin 5810 which is inserted through a connecting pin insertion hole 5808 (see FIG. 15) provided at the tip of the first longitudinal portion 5802 and a connecting pin insertion hole 5048 (see FIG. 13C) of the protruding portion 5046 of the intermediate member 5030.

The tip of the second longitudinal portion 5806 is connected to the lower end of the connecting member 60 by a plurality of screws 5814 that passes through a plurality of screw insertion holes 5812 provided at the tip of the second longitudinal portion 5806. Accordingly, the lower end of the connecting member 60 is connected to the foot pedal support mechanism 52 via the lower arm 58.

By providing the lower arm 58 in this manner, it is advantageous in easily connecting the foot pedal support mechanism 52 and the connection mechanism 56.

As illustrated in FIGS. 5 and 16A-16B, the connecting member 60 is formed of a narrow plate material having a uniform thickness and a uniform width. The connecting member 60 includes a lower portion 6002 extending through the gap S in the vertical direction and an upper portion 6004 that rises from the upper end of the lower portion 6002 while approaching the lavatory 18A side.

A plurality of screw holes 6006 into which the screws 5814 (see FIG. 8) are screwed is provided at the lower end of the lower portion 6002, and attachment holes 6010 are provided at the tip of the upper portion 6004.

As illustrated in FIGS. 5, 8, and 9, guides 66, including guide grooves 6602 for guiding the lower portion 6002 of the connecting member 60 are attached by bolts 6604 to the upper and lower portions of the compartment side wall 3408A disposed on the frame front wall 2210 side.

The guide groove 6602 is formed as a long groove whose length is greater than its width.

The width of the guide groove 6602 is slightly larger than the thickness of the connecting member 60 so that the lower portion 6002 can slide up and down inside the guide groove 6602.

The guide groove 6602 is formed in a dimension to have such a length that the lower portion 6002 of the connecting member 60 is close to one end of the guide groove 6602 in the longitudinal direction at the upper limit position of the foot pedal 50 as illustrated in FIG. 8, and the lower portion 6002 of the connecting member 60 is close to the other end of the guide groove 6602 in the longitudinal direction at the lower limit position of the foot pedal 50 as illustrated in FIG. 9.

In an aircraft, the fuselage is subject to vibrations during take-off, landing, and flight. However, since the connecting member 60 is long, this vibration causes a large inertial force to act on the connecting member 60. Accordingly, providing the guide 66 allows for the inertial force of the connecting member 60 due to this vibration being prevented from directly transmitted to the torsion spring 44 and the hinge mechanism 42 that supports the waste flap 40, and the durability of the hinge mechanism 42 and the torsion spring 44 being not adversely affected.

As illustrated in FIGS. 5, 17 and 18, the base portion of the outer arm 62 is attached to and integrally rotatable with the rotating shaft 64 disposed above the chute 38. The tip portion of the outer arm 62 and an upper end of the upper portion 6004 of the connecting member 60 are rotatably connected via an E-ring 6204 and a pin 6202 inserted through an attachment hole (not illustrated) of the outer arm 62 and an attachment hole 6010 (see FIG. 16A) of the upper portion 6004.

Figure 20:
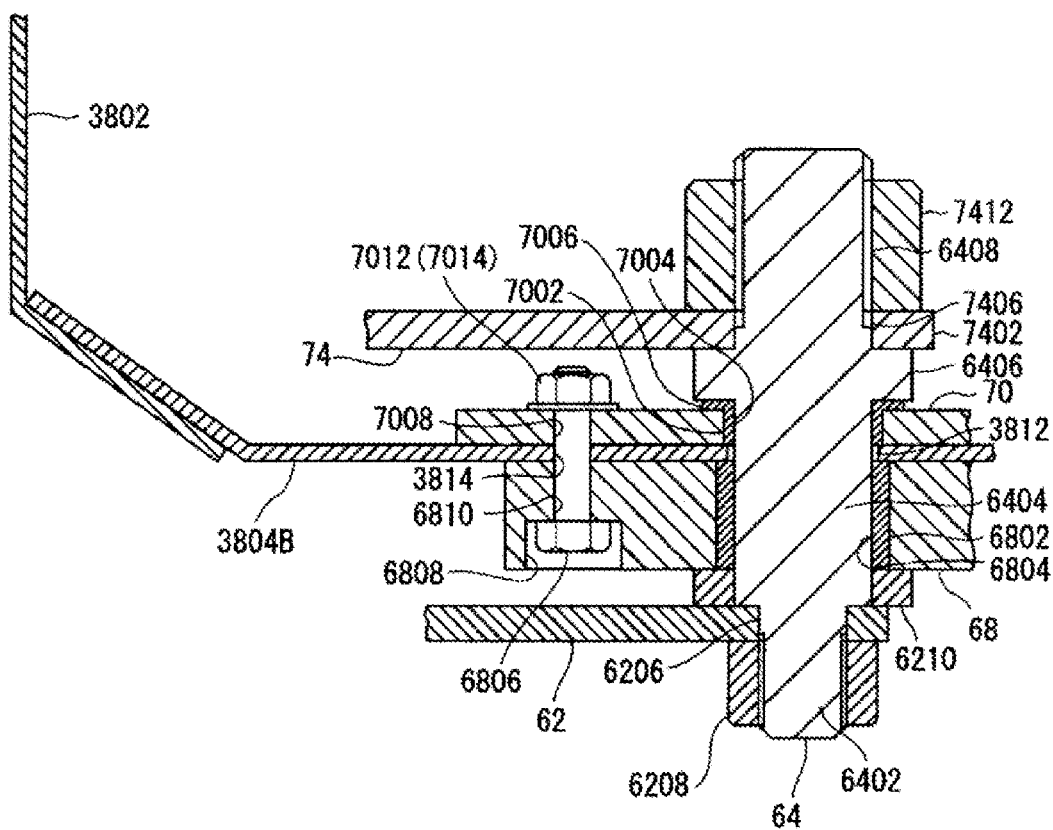
FIG. 20 is a cross-sectional view of a support shaft portion that constitutes the waste flap swing mechanism.

As illustrated in FIG. 5, the rotating shaft 64 is disposed in an expanded wall 3804B of the upper portion of the chute side wall 3804A, and as illustrated in FIG. 20, is inserted through a hole 3812 of the expanded wall 3804B and extends across the interior and exterior of the chute 38.

The rotating shaft 64 includes an outer male thread portion 6402, an intermediate shaft portion 6404 continuous to the outer male thread portion 6402, a large-diameter portion 6406 provided in a section near the end of the intermediate shaft portion 6404, and an inner male thread portion 6408 continuous to the end of the intermediate shaft portion 6404.

The rotating shaft 64 is rotatably supported by the expanded wall 3804B via an outer bracket 68 disposed on the outer surface of the expanded wall 3804B and an inner bracket 70 disposed on the inner surface of the expanded wall 3804B.

As illustrated in FIGS. 17 and 18, the outer bracket 68 has an elongated shape in the horizontal direction. As illustrated in FIG. 20, an insertion hole 6802 through which the intermediate shaft portion 6404 is inserted is provided at the center in the longitudinal direction thereof. A bearing 6804 such as a metal bearing or a rolling bearing is disposed in the insertion hole 6802, and the intermediate shaft portion 6404 is rotatably supported by the bearing 6804.

A housing recess 6808 for housing the head of the bolt 6806, and a bolt insertion hole 6810 passing through the bottom surface of the housing recess 6808 are provided at both ends of the outer bracket 68 in the longitudinal direction.

The inner bracket 70 has a disc shape. As illustrated in FIG. 20, an insertion hole 7002 through which the intermediate shaft portion 6404 is inserted is provided at the center thereof. A bearing 7004 such as a metal bearing or a rolling bearing is disposed in the insertion hole 7002, and the intermediate shaft portion 6404 is rotatably supported by the bearing 7004.

In the present embodiment, a metal bearing is used as the bearing 7004, and the metal bearing includes a cylindrical portion that rotatably supports the intermediate shaft portion 6404, and a collar portion 7006 that extends in an annular plate shape from the end of the cylindrical portion.

The collar portion 7006 contacts the inner surface of the inner bracket 70 and the outer surface of the large-diameter portion 6406 of the rotating shaft 64 allowing the rotating shaft 64 to rotate smoothly.

Figure 19:
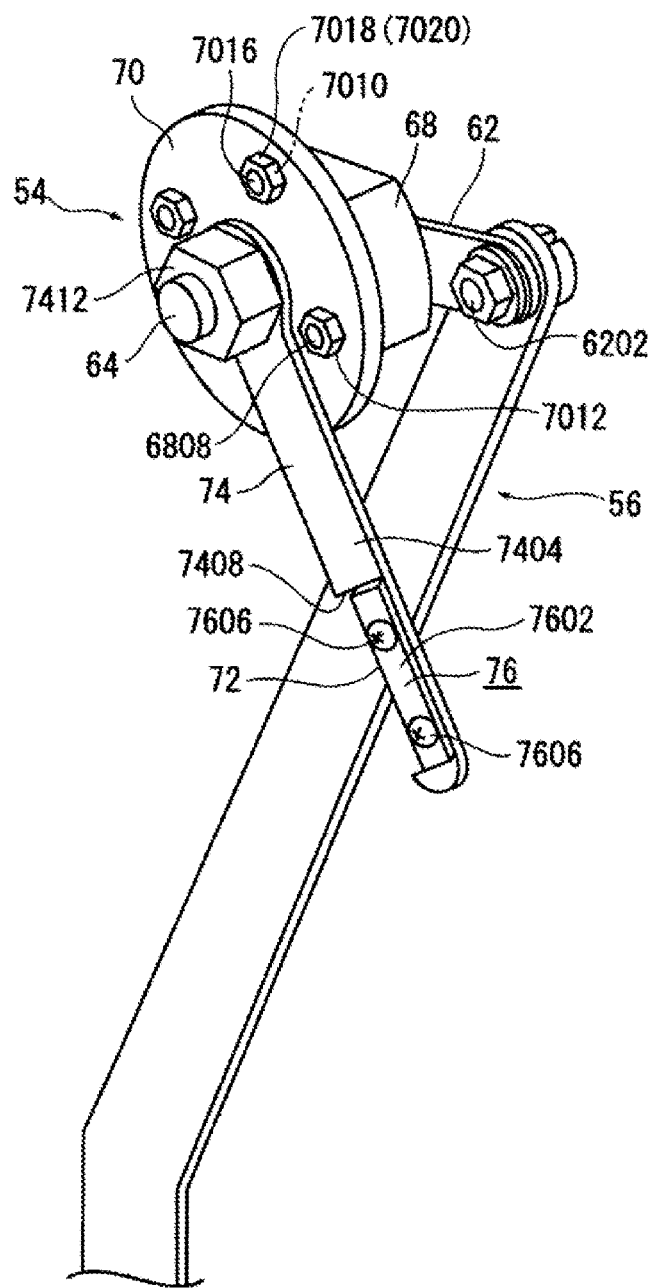
FIG. 19 is a perspective view of the waste flap swing mechanism as seen from the inside of the chute in which an expanded wall is omitted.

Bolt insertion holes 7008 are provided at sections each corresponding to the bolt insertion holes 6810 of the outer bracket 68 on the outer peripheral portion of the inner bracket 70. As illustrated in FIG. 19, a bolt insertion hole 7010 is provided in the upper and lower portions of the outer peripheral portion of the inner bracket 70.

As illustrated in FIG. 20, the outer bracket 68 is overlaid on the outer surface of the expanded wall 3804B, the inner bracket 70 is overlaid on the inner surface of the expanded wall 3804B, the bolt 6806 is inserted through the bolt insertion hole 7008 of the inner bracket 70 while passing through the bolt insertion hole 3814 of the expanded wall 3804B from the bolt insertion hole 6810 and the housing recess 6808 of the outer bracket 68, and the nut 7012 is fastened to the male thread of the bolt 6806 protruding from the inner bracket 70. The bolt 6806 and the nut 7012 constitute a first fastener 7014, and the first fastener 7014 attaches the outer bracket 68 and the inner bracket 70 to the expanded wall 3804B.

That is, the rotating shaft 64 is not supported by brackets provided on either the inner surface or the outer surface of the expanded wall 3804B, but is supported by brackets provided on both surfaces of the expanded wall 3804B, and the brackets receive the reaction force received by the expanded wall 3804B when the waste flap 40 swings in a distributed manner and firmly support the rotating shaft 64 allowing the waste flap 40 to swing smoothly.

Further, as illustrated in FIG. 19, a bolt 7016 is inserted through bolt insertion holes 7010 in the upper and lower portions of the inner bracket 70 from a bolt insertion hole (not illustrated) of the expanded wall 3804B, and a nut 7018 is fastened to a male thread of the bolt 7016 protruding from the inner bracket 70. The bolt 7016 and nut 7018 constitute a second fastener 7020, and the second fastener 7020 attaches the inner bracket 70 to the expanded wall 3804B at a section other than a section where the outer bracket 68 is attached to the expanded wall 3804B.

That is, when the waste flap 40 swings, a larger load is applied to the inner bracket 70 than to the outer bracket 68. Accordingly, the inner bracket 70 is more firmly attached to the expanded wall 3804B allowing the waste flap 40 to swing smoothly.

As illustrated in FIG. 20, the outer arm 62 is attached to integrally rotate with the rotating shaft 64 in such a way that an outer male screw portion 6402 is inserted through an attachment hole 6206 in the base portion of the outer arm 62, the outer arm 62 abuts an annular end surface of a section at the boundary between the outer male screw portion 6402 and the intermediate shaft portion 6404, and the outer arm 62 is sandwiched between the annular end surface and a nut 6208 screwed onto the outer male thread portion 6402.

An annular plate-shaped slip member 6210 formed of a material having a small coefficient of friction with respect to the outer arm 62 and the outer bracket 68 is disposed on the outer peripheral portion of the intermediate shaft portion 6404 located between the base portion of the outer arm 62 and the outer surface of the outer bracket 68 allowing the outer arm 62 to swing smoothly.

The waste flap swing mechanism 54 includes the engaged pin 46, which is an engaged portion, provided in the waste flap 40, as illustrated in FIG. 6, the rotating shaft 64, as illustrated in FIG. 17, and the inner arm 74 including the engagement portion 72 that is swingably supported inside the chute 38 via the rotating shaft 64 and is detachably engaged with the engaged pin 46.

As illustrated in FIG. 21, the inner arm 74 includes a circular base portion 7402 and an extension portion 7404 extending linearly from the base portion 7402.

The inner arm 74 is formed of a plate material having a uniform thickness, an attachment hole 7406 is formed in the base portion 7402, a notch 7408 is formed in the extension portion 7404, and a plurality of screw holes 7410 is formed in the section of the extension portion 7404 where the notch 7408 is formed.

As illustrated in FIG. 19, an engaging member 76 including an engagement portion 72 is attached to the section of the extension portion 7404 where the notch 7408 is formed.

As illustrated in FIGS. 22A-22B, the engaging member 76 includes an attachment plate portion 7602 that is detachably attached to the extension portion 7404 at a section provided with the notch 7408, and a plate-shaped engagement portion 72 formed by bending from the attachment plate portion 7602.

The engaging member 76 is formed of a material having a low coefficient of friction with respect to the engaged pin 46 (see FIG. 17).

As illustrated in FIG. 19, the engaging member 76 is attached to the inner arm 74 by screwing the screw 7606 inserted through the screw insertion hole 7604 of the attachment plate portion 7602 into the screw hole 7410 of the extension portion 7404. With the engaging member 76 attached in this manner, the engagement portion 72 covers the bottom portion of the notch 7408.

As illustrated in FIGS. 17 and 18, the engagement portion 72 extends linearly and is formed in an open shape in the direction in which the waste flap 40 swings from the closed position to the opened position.

As illustrated in FIG. 20, the inner male thread portion 6408 of the rotating shaft 64 is inserted through the attachment hole 7406 of the inner arm 74, the nut 7412 is screwed onto the inner male thread portion 6408, and the base portion 7402 of the inner arm 74 is sandwiched between the nut 7412 and the large-diameter portion 6406 of the rotating shaft 64. In this way, the inner arm 74 is attached to integrally rotate with the rotating shaft 64.

The outer arm 62 and the inner arm 74 are attached to the rotating shaft 64 so that at the upper limit position of the foot pedal 50, as illustrated in FIG. 17, the engaged pin 46 is located near one end in the longitudinal direction of the engagement portion 72, and the waste flap 40 is in the closed position, and at the lower limit position of the foot pedal 50, as illustrated in FIG. 18, the engaged pin 46 is located near the other end in the longitudinal direction of the engagement portion 72 and the waste flap 40 is in the opened position.

By providing the rotating shaft 64 penetrating the expanded wall 3804B in this way, it is advantageous in easily connecting the outer arm 62 constituting the connection mechanism 56 and the inner arm 74 constituting the waste flap swing mechanism 54.

Since the engaged pin 46 contacts the engagement portion 72 and does not contact the inner arm 74, it is sufficient to replace the worn engaging member 76 without replacing the inner arm 74 at maintenance, and it is advantageous in easily performing the maintenance work in a short time.

According to the aircraft lavatory unit 18 of the present embodiment, stepping on the foot pedal 50 brings the waste flap 40 to the opened position opening the trash feeding opening 3810 via the connection mechanism 56 and the waste flap swing mechanism 54, and trash can be thrown without using a hand. When the foot is released from the foot pedal 50, the foot pedal 50 is returned to the upper limit position by the foot pedal support mechanism 52, and the waste flap 40 returns to the closed position closing the trash feeding opening 3810, and a fire spreading prevention space is formed from the chute 38 to the waste container 36.

Further, the foot pedal 50 is disposed close to the waste compartment 34, and is disposed inclining such that the foot pedal front end 50A away from the waste compartment 34 at the upper limit position is located at a section lower than the foot pedal rear end 50B directly below the waste compartment 34, and thus the foot pedal 50 is formed to swing by using the section of the foot pedal front end 50A as a fulcrum.

For this reason, compared with a case where the foot pedal 50 is disposed such that the foot pedal front end 50A is located at a section higher than the foot pedal rear end 50B at the upper limit position and the foot pedal 50 swings by using the foot pedal rear end 50B as a fulcrum, it is advantageous in preventing troubles such as tripping over due to shoes getting caught at the foot pedal 50 on the narrow floor 18B of the aircraft lavatory unit 18.

Further, even if the foot pedal 50 is disposed, it is advantageous in preventing troubles such as tripping over the foot pedal 50, which is advantageous in arranging the foot pedal 50 without impairing the usability in the lavatory 18A.

Further, when the foot pedal 50 is configured such that the foot pedal front end 50A away from the waste compartment 34 is the highest, and the foot pedal 50 swings by using the lowest section of the foot pedal rear end 50B directly below the waste compartment 34 as a fulcrum, the foot pedal 50 is likely to be stepped on with the whole weight, and an excessive load is likely to be applied to the foot pedal support mechanism 52, the waste flap swing mechanism 54, and the connection mechanism 56.

On the other hand, the foot pedal 50 of the present embodiment is disposed close to the waste compartment 34 and is configured such that the foot pedal front end 50A away from the waste compartment 34 is the lowest, and the foot pedal 50 swings by using the section of the foot pedal front end 50A as a fulcrum, it is easy to guide the foot pedal 50 being stepped on with the heel on the floor 50 of the lavatory 18A.

Accordingly, the foot pedal 50 is not likely to be stepped on with the whole weight, and it is possible to prevent an excessive load from being applied to the foot pedal support mechanism 52, the waste flap swing mechanism 54, and the connection mechanism 56, which is advantageous in enhancing the durability of the foot pedal-type waste flap opening/closing mechanism 48.

Further, the foot pedal rear end 50B, which is located at the highest position, may be located on the outer side of the opening/closing plate 32 in a state in which the receiving chamber 2812 is closed in a plan view. However, in the present embodiment, the foot pedal rear end 50B is put under the opening/closing plate 32 and the waste compartment 34, and in a plan view, the foot pedal rear end 50B overlaps at least the contour of the opening/closing plate 32 in a state where the receiving chamber 2812 is closed.

That is, a portion of the foot pedal 50 located at the highest position is disposed outside the floor 18B of the lavatory 18A used by the user.

Accordingly, compared with a case where the entire foot pedal 50 is disposed exposing on the floor 18B of the lavatory 18A, the area of the floor 18B of the lavatory 18A can be increased.

Accordingly, it is more advantageous in preventing troubles such as the user of the lavatory 18A tripping over the foot pedal 50, and in improving the usability of the aircraft lavatory unit 18.

In addition, it becomes easier to guide the foot pedal 50 being stepped on with the heel on the floor 18B of the lavatory 18A, thus the foot pedal 50 is less likely to be stepped on with the whole weight, and it is more advantageous in improving the durability of the foot pedal-type waste flap opening/closing mechanism 48.

Further, in the waste disposal device 30 of the aircraft lavatory unit 18, from the viewpoint of emphasizing the fire spreading prevention space of the waste disposal device 30, the durability is strictly required for the hinge mechanism 42 that swingably supports the waste flap 40 and the torsion spring 44 that biases the waste flap 40 to the closed position.

Accordingly, it is necessary to add a foot pedal system not to affect the existing hinge mechanism 42 and torsion spring 44.

In the present embodiment, the engaged pin 46 which is an engaged portion is provided in the waste flap 40, the engagement portion 72 of the inner arm 74 of the waste flap swing mechanism 54 is engaged with the engaged pin 46, and the waste flap 40 swings from the closed position to the opened position.

In other words, when the foot pedal 50 causes the waste flap 40 to swing from the closed position to the opened position, the force for swinging the waste flaps 40 is not applied directly to the hinge mechanism 42, but the force is applied to the waste flaps 40. Accordingly, even if the waste flap 40 is swung by the foot pedal 50, the force acting on the support shaft 4202, the hinge pieces 4204A and 4204B, and the torsion spring 44, which constitute the hinge mechanism 42 is identical to the force acting when pushing the waste flap 40 with a hand and throwing trash. Accordingly, the durability of the existing hinge mechanism 42 and torsion spring 44 is not affected.

The engagement portion 72 for swinging the waste flap 40 from the closed position to the opened position is formed in an opening-shape in the direction in which the waste flap 40 swings from the closed position to the opened position.

Accordingly, even when the foot pedal 50 is not stepped on by the foot, the waste flap 40 can be swung from the closed position to the opened position by hand without any trouble, which is advantageous in improving the usability of the waste disposal device 30.

In addition, the waste flap 40 includes the rectangular board portion 4002 and the flanges 4004 that stand up from four sides of the base portion 4002. The four sides of the base portion 4002 are reinforced by the flanges 4004 and are sections where the strength and rigidity are enhanced.

In the present embodiment, the engaged pin 46 as an engaged portion is provided on one of the four sides of the base plate portion 4002 via the attachment piece 4008, and the waste flap 40 swings from the closed position to the opened position via the engaged pin 46.

Accordingly, since the force for swinging the waste flap 40 acts on the sections where the strength and rigidity of the waste flap 40 are enhanced, it is advantageous in enhancing the durability of the waste flap 40 without affecting the durability of the waste flap 40.

Further, in the aircraft lavatory unit 18, the small gap S serving as a dead space is formed between the compartment side wall 3408A, which is one of the pair of compartment side walls 3408 located on both sides of the opening portion 3410, and the frame front wall 2210 that partitions the lavatory 18A.

In the present embodiment, the connecting member 60 extending in the vertical direction and connecting the foot pedal support mechanism 52 and the waste flap swing mechanism 54 is disposed in the gap S. Thus, it is advantageous in decreasing the number of sections to be processed when attaching the foot pedal-type waste flap opening/closing mechanism 48 of the present embodiment to the existing waste disposal device 30 of the aircraft lavatory unit 18. Accordingly, it is possible to easily attach the foot pedal-type waste flap opening/closing mechanism 48, which is advantageous for cost reduction.

In addition, the guides 66 that guides the connecting member 60, elongated in the vertical direction, movably in the vertical direction are provided in a plurality of sections of the compartment side wall 3408A spaced from each other in the vertical direction. Accordingly, the inertial force of the connecting member 60 caused by the vibration of the fuselage received during take-off, landing, and flight is not allowed to be directly transmitted to the hinge mechanism 42 and the torsion spring 44 that support the waste flap 40. Moreover, the foot pedal-type waste flap opening/closing mechanism 48 is not allowed to affect the durability of the hinge mechanism 42 and the torsion spring 44.

The connection mechanism 56 includes the lower arm 58 that swings integrally with the foot pedal 50, extends below the waste compartment 34, and is connected to the lower end of the connecting member 60, and the lower arm 58 is arranged through the notch 2406 of the side surface portion 2404 of the floor pan 24. Accordingly, the foot pedal 50 and the connecting member 60 can be connected by providing the notch 2406 in the side surface portion 2404 of the floor pan 24. Accordingly, it is advantageous in decreasing the number of sections to be processed when attaching the foot pedal-type waste flap opening/closing mechanism 48 to the existing waste disposal device 30 of the aircraft lavatory unit 18, which is advantageous for cost reduction.

In addition, the foot pedal 50 is disposed close to the section directly below the waste compartment 34, and the foot pedal support mechanism 52 is configured such that the foot pedal 50 at the upper limit position is inclined and supported so that the foot pedal rear end 50B is located above the foot pedal front end 50A, and the foot pedal rear end 50B swings in the vertical direction by using the foot pedal front end 50A as a fulcrum. The longitudinal direction of the foot pedal 50 extends in the extension direction of the seat group 12 which is the arrangement direction of the seat rows 1202. The width direction of the foot pedal 50 extends in the direction orthogonal to the extension direction of the longitudinal aisle 14.

Accordingly, even if the foot pedal 50 is disposed, it is advantageous in preventing troubles such as tripping over the foot pedal 50. It is not necessary to widen the floor 18B of the lavatory 18A and increase the width and the length of the aircraft lavatory unit 18 in correspondence with the length and the width of the foot pedal 50 in consideration of the usability in the lavatory 18A. Accordingly, it is advantageous in arranging the foot pedal 50 without decreasing the number of seat rows 1202 and narrowing the longitudinal aisle 14.

The invention claimed is:

1. A waste disposal device of an aircraft lavatory unit, comprising:
    a waste compartment provided on a floor of the aircraft lavatory unit installed in an aircraft and comprising an opening portion through which a waste container is taken in and out;
    a chute provided in an upper portion of the waste compartment and comprising a trash feeding opening formed; and
    a waste flap swingably supported by the chute between a closed position for closing the trash feeding opening and an opened position for opening the trash feeding opening and biased in a direction of closing the trash feeding opening;
    a foot pedal-type waste flap opening/closing mechanism that swings the waste flap from the closed position to the opened position by stepping on a foot pedal disposed close to a section on the floor directly below the waste compartment being provided,
    the foot pedal-type waste flap opening/closing mechanism comprising a foot pedal support mechanism that swingably supports the foot pedal between an upper limit position at which the foot pedal can be stepped on and a lower limit position at which the foot pedal is stepped on from the upper limit position and biases the foot pedal allowing the foot pedal to be located at the upper limit position, and
    the foot pedal support mechanism being configured such that the foot pedal at the upper limit position is inclined and supported with a foot pedal rear end located directly below the waste compartment being located above a foot pedal front end that is away from the waste compartment and that the foot pedal rear end swings in a vertical direction by using the foot pedal front end as a fulcrum.

2. The waste disposal device of the aircraft lavatory unit according to claim 1, wherein
    the opening portion of the waste compartment is opened and closed by an opening/closing plate provided with a trash feeding port at a section corresponding to the trash feeding opening,
    a fire spreading prevention space is formed from the chute to the waste compartment in a state where the trash feeding opening is closed by the waste flap and the opening portion is closed by the opening/closing plate,
    lower ends of the waste compartment and the opening/closing plate are located at a section upwardly separated from the floor of the aircraft lavatory unit, and
    the foot pedal rear end is located below the opening/closing plate in a state where the opening portion is closed, and the foot pedal rear end in a plan view overlaps a contour of the opening/closing plate in the state where the opening portion is closed.

3. The waste disposal device of the aircraft lavatory unit according to claim 1, wherein
    the foot pedal-type waste flap opening/closing mechanism further comprises a waste flap swing mechanism that engages with the waste flap and swings the waste flap from the closed position to the opened position,
    the waste flap swing mechanism comprises an inner arm comprising an engaged portion provided in the waste flap and an engagement portion that is swingably supported inside the chute and is detachably engaged with the engaged portion, and
    the inner arm swings by stepping on the foot pedal, and the engagement portion engages with the engaged portion and swings the waste flap from the closed position to the opened position.

4. The waste disposal device of the aircraft lavatory unit according to claim 3, wherein
the engagement portion is formed in an open shape in a direction of swing of the waste flap from the closed position to the opened position.

5. The waste disposal device of the aircraft lavatory unit according to claim 3, wherein
an engaging member is detachably attached to the inner arm, and
the engagement portion is provided on the engaging member.

6. The waste disposal device of the aircraft lavatory unit according to claim 3, wherein
the foot pedal-type waste flap opening/closing mechanism further comprises a connection mechanism that connects the foot pedal support mechanism and the waste flap swing mechanism,
the waste compartment comprises a pair of waste compartment side walls located on both sides of the opening portion,
a body frame of the aircraft lavatory unit comprises a plurality of frame walls partitioning a lavatory,
one waste compartment side wall of the pair of waste compartment side walls is disposed adjacent to one frame wall of the plurality of frame walls,
the chute comprises a chute front wall provided with the trash feeding opening and a pair of chute side walls connected to the chute front wall,
one chute side wall of the pair of chute side walls is disposed adjacent to the one frame wall,
a rotating shaft is provided in an upper portion of the one chute side wall, the rotating shaft penetrating the chute side wall and rotatably supported by the chute side wall,
the inner arm is attached to the rotating shaft and integrally rotates with the rotating shaft on an inner surface of the one chute side wall,
the connection mechanism comprises an outer arm that is attached to the rotating shaft and allowed to integrally rotate with the rotating shaft on an outer surface of the one chute side wall and rotates the rotating shaft by stepping on the foot pedal.

7. The waste disposal device of the aircraft lavatory unit according to claim 6, wherein
an expanded wall expanding in a direction away from the other chute side wall is provided on an upper portion of the one chute side wall,
the rotating shaft penetrates the expanded wall and is rotatably supported by the expanded wall,
an outer bracket rotatably supporting a section of the rotating shaft located on an outer surface of the expanded wall is provided on the outer surface,
an inner bracket rotatably supporting a section of the rotating shaft located on an inner surface of the expanded wall is provided on the inner surface, and
the outer bracket and the inner bracket are attached to the expanded wall by being fastened by a plurality of first fasteners penetrating the expanded wall and sandwiching the expanded wall.

8. The waste disposal device of the aircraft lavatory unit according to claim 7, wherein
the inner bracket is further fastened to the expanded wall by a plurality of second fasteners different from the first fasteners.

9. The waste disposal device of the aircraft lavatory unit according to claim 3, wherein
the waste flap comprises a rectangular board portion, four flanges standing from four sides of the board portion, and an expanded portion provided at a center of the board portion and inserted into the trash feeding opening,
a hinge mechanism swingably supporting the waste flap and biasing the waste flap to the closed position is provided across one of the four flanges and a chute upper wall of the chute, and
the engaged portion is provided at a section of one side of the board portion on which another flange of the four flanges stands.

10. The waste disposal device of the aircraft lavatory unit according to claim 6, wherein
the connection mechanism comprises a connecting member disposed between one waste compartment side wall and the one frame wall, extending in a vertical direction, and comprising an upper end connected to the outer arm and a lower end connected to the foot pedal support mechanism.

11. The waste disposal device of the aircraft lavatory unit according to claim 10, wherein
a guide that guides the connecting member in a vertical direction is provided in a plurality of sections of the one waste compartment side wall spaced from each other in a vertical direction.

12. The waste disposal device of the aircraft lavatory unit according to claim 10, wherein
the connection mechanism comprises a lower arm that is connected to the foot pedal rear end, swings integrally with the foot pedal rear end, and extends below the waste compartment, and
a lower end of the connecting member is connected to a tip of the lower arm.

13. The waste disposal device of the aircraft lavatory unit according to claim 12, wherein
a body frame of the aircraft lavatory unit comprises a frame bottom wall,
a floor pan is disposed on the frame bottom wall,
the floor pan comprises a bottom surface portion constituting the floor of the aircraft lavatory unit and a side surface portion standing from a periphery of the bottom surface portion,
the foot pedal support mechanism is disposed on the bottom surface portion, and
a notch through which the lower arm protrudes toward a lower side of the waste compartment is provided in the side surface portion.

14. The waste disposal device of the aircraft lavatory unit according to claim 12, wherein
the foot pedal support mechanism comprises a lower member placed on the bottom surface portion of the floor pan and attached to the frame bottom wall, a support shaft, and a torsion spring,
the foot pedal comprises an intermediate member swingably coupled with the support shaft and biased to the upper limit position by the torsion spring and an upper member that is attached to the intermediate member, swings integrally with the intermediate member, and covers the lower member, the support shaft, and the torsion spring, and
the lower arm is connected to the intermediate member.

15. The waste disposal device of the aircraft lavatory unit according to claim 1, wherein a fuselage of the aircraft comprises a longitudinal aisle extending in a longitudinal direction of the fuselage, a seat group configured by arranging seat rows in the longitudinal direction of the fuselage on both sides of the longitudinal aisle, and a latitudinal aisle provided behind the seat row located at a rear end of the seat group and orthogonal to the longitudinal aisle, the aircraft lavatory unit is provided between the latitudinal aisle and the seat row located at the rear end of the seat group, the body frame comprises a frame front wall provided with an entrance and facing the longitudinal aisle and a frame side wall adjacent to the seat row located at the rear end of the seat group, the waste compartment is provided on an inner surface of the frame side wall with the opening portion facing the latitudinal aisle, the foot pedal has a longitudinal direction along a direction of connecting the foot pedal front end and the foot pedal rear end and a width direction along a direction orthogonal to the longitudinal direction, the longitudinal direction of the foot pedal extends in a direction in which the seat rows are arranged, and the width direction of the foot pedal extends in a direction orthogonal to an extension direction of the longitudinal aisle.

* * * * *